US012236002B2

(12) United States Patent
Kreder, III

(10) Patent No.: US 12,236,002 B2
(45) Date of Patent: Feb. 25, 2025

(54) SYSTEM FOR SECURE MULTI-PROTOCOL PROCESSING OF CRYPTOGRAPHIC DATA

(71) Applicant: GRIDPLUS, INC., Austin, TX (US)

(72) Inventor: Karl J. Kreder, III, Austin, TX (US)

(73) Assignee: GRIDPLUS, INC., Austin, TX (US)

( * ) Notice: Subject to any disclaimer, the term of this patent is extended or adjusted under 35 U.S.C. 154(b) by 396 days.

(21) Appl. No.: 17/454,565

(22) Filed: Nov. 11, 2021

(65) Prior Publication Data

US 2023/0144774 A1    May 11, 2023

(51) Int. Cl.
*G06F 21/79*    (2013.01)
*G06F 21/60*    (2013.01)
*G06F 21/72*    (2013.01)
*G06F 21/83*    (2013.01)

(52) U.S. Cl.
CPC ............ *G06F 21/79* (2013.01); *G06F 21/602* (2013.01); *G06F 21/72* (2013.01); *G06F 21/83* (2013.01)

(58) Field of Classification Search
CPC ........ G06F 21/79; G06F 21/602; G06F 21/72; G06F 21/83; G06F 21/53; G06F 21/57; H04L 9/50; H04L 9/3297; H04L 2209/56
See application file for complete search history.

(56) References Cited

U.S. PATENT DOCUMENTS

| 7,051,212 B2 | 5/2006 | Ginter et al. |
| 9,785,926 B2 | 10/2017 | Sanford et al. |
| 10,733,176 B2 | 8/2020 | Cochrane et al. |
| 2011/0307703 A1 | 12/2011 | Ogg et al. |
| 2014/0196107 A1 | 7/2014 | Lindberg et al. |

(Continued)

FOREIGN PATENT DOCUMENTS

| AU | 2009239396 A1 | 10/2009 |
| CA | 2850250 C | 9/2020 |

(Continued)

OTHER PUBLICATIONS

Erdene-Ochir, O., "Patent Cooperation Treaty International Search Report and Written Opinion dated Mar. 14, 2023", Patent Cooperation Treaty Application Number PCT/US22/79645, Patent Cooperation Treaty, Mar. 14, 2023.

(Continued)

*Primary Examiner* — Sangseok Park
(74) *Attorney, Agent, or Firm* — Lindauer Law, PLLC

(57) ABSTRACT

A general computing environment (GCE) determines request data comprising payload data and instruction data to use cryptographic functions in a secure computing environment (SCE). The SCE provides secure input and output devices, allowing secure presentation to a user and acquisition of user input. The SCE receives the request data and processes the payload data using the instructions in the instruction data to produce cryptographic output data. The request data may be determined using schemas that specify the formatting, grammar, and other attributes of data associated with a transaction that utilizes cryptographic functions. By using schemas and the request data, the SCE may support any protocol that uses the cryptographic functions supported by that SCE to compose cryptographic output. To enhance user comprehensibility and security, the SCE may securely replace some data with human readable text or images and present this as abstracted request data.

17 Claims, 8 Drawing Sheets

(56) References Cited

U.S. PATENT DOCUMENTS

| | | | |
|---|---|---|---|
| 2014/0258736 A1 | 9/2014 | Merchan et al. | |
| 2016/0149710 A1* | 5/2016 | Huxham | H04L 9/3263 |
| | | | 713/175 |
| 2016/0275461 A1 | 9/2016 | Sprague et al. | |
| 2016/0294564 A1 | 10/2016 | Mock | |
| 2016/0306953 A1 | 10/2016 | Cambou | |
| 2017/0221288 A1 | 8/2017 | Johnson et al. | |
| 2018/0041345 A1 | 2/2018 | Maim | |
| 2018/0183802 A1* | 6/2018 | Choyi | H04L 63/205 |
| 2018/0254898 A1* | 9/2018 | Sprague | H04L 9/0637 |
| 2019/0013943 A1 | 1/2019 | Maim | |
| 2019/0180273 A1 | 6/2019 | Cummings et al. | |
| 2019/0268332 A1 | 8/2019 | Wang | |
| 2019/0280864 A1 | 9/2019 | Cheng et al. | |
| 2019/0325408 A1* | 10/2019 | Goroff | G06Q 20/3825 |
| 2019/0378119 A1 | 12/2019 | Hyuga et al. | |
| 2019/0394025 A1 | 12/2019 | Maim | |
| 2020/0021446 A1 | 1/2020 | Roennow et al. | |
| 2020/0036519 A1 | 1/2020 | Bitauld et al. | |
| 2020/0099518 A1 | 3/2020 | Jacobs et al. | |
| 2020/0143466 A1 | 5/2020 | Wu et al. | |
| 2020/0280855 A1 | 9/2020 | Avetisov et al. | |
| 2020/0349546 A1* | 11/2020 | Bedier | G06Q 20/085 |
| 2020/0387893 A1 | 12/2020 | Maim | |
| 2021/0097528 A1 | 4/2021 | Wang | |
| 2022/0051240 A1* | 2/2022 | Shamai | G06Q 20/0655 |

FOREIGN PATENT DOCUMENTS

| | | |
|---|---|---|
| WO | 2016120826 A2 | 8/2016 |
| WO | 2017122187 A2 | 7/2017 |
| WO | 2018211382 A1 | 11/2018 |
| WO | 2020234824 A1 | 11/2020 |

OTHER PUBLICATIONS

"A First Look at the Grid+Lattice1 Hardware Wallet 11", 1 page, Oct. 18, 2018. Retrieved from the Internet: URL: https://www.youtube.com/watch?v=aypJYpWmxuk.

"DevCon4 Lattice Demo", 1 page, Nov. 28, 2018. Retrieved from the Internet: URL: https://www.youtube.com/watch?v=YkJpQ19hYYU.

"Filament Security Overview Networking Devices at the Edge of Risk", Apr. 1, 2017, 12 pages. Retrieved from the Internet: URL:https://filamet.com/assets/downloads/Filament%20Security.pdf.

"Gemalto and Ledger Join Forces to Provide Security Infrastructure for Cryptocurrency Based Activities", Oct. 14, 2017, 3 pages, Thales Group 2021. Retrieved from the Internet: URL: https://www.thalesgroup.com/en/markets/digital-identity-and-security/press-release/gemalto-and-ledger-join-forces-to-provide-security-infrastructure-for-cryptocurrency-based-activities-.

"How to DeFi on Polkadot Series", 23 pages, Polkaswap Community Collective, Medium.com. Retrieved from the Internet: URL: https://medium.com/@polkaswapcommunitycollective/how-to-defi-on-polkadot-series-b7c34733d5f5.

"Lattice1 Safe Cards", 1 page, Oct. 29, 2018. Retrieved from the Internet: URL: https://www.youtube.com/watch?v=ZIKOhYWIGyE.

"Ledger", Ledger SAS, 13 pages. Retrieved from the Internet: URL: https://www.ledger.com/.

"OpenPGP card", Wikipedia, 3 pages. Retrieved from the Internet on Sep. 29, 2021. URL: https://en.wikipedia.org/wiki/OpenPGP_card.

"PKCS #11 Cryptographic Token Interface Base Specification Version 2.40", OASIS, OASIS Standard, Apr. 14, 2015, pp. 1-149. Retrieved from the Internet: URL: http://docs.oasis-open.org/pkcs11/pkcs11-base/v2.40/os/pkcs11-base-v2.40-os.doc.

"SafePal Crypto Hardware Wallet (Official)", SafePal, 4 pages. Retrieved from the Internet: URL: https://www.safepal.io/.

"Specifys That Certs Must Be Checked to Receive Payment" Jun. 12, 2019. Retrieved from the Internet: URL: https://github.com/GridPlus/phonon-network/commit/77fe11a7d398268ad061029465a63bf66e653147.

"Supported Cryptocurrencies", SafePal, 2 pages. Retrieved from the Internet: URL: https://safepalsupport.zendesk.com/hc/en-us/articles/360057304752-Supported-Cryptocurrencies.

"Thales Luna HSMs", Thales 2021, 2 pages. Retrieved from the Internet: URL: https://cpl.thalesgroup.com/encryption/hardware-security-modules/network-hsms.

"Trezor Hardware Wallet (Official)", 50 pages. SatoshiLabs s.r.o 2012-2021. Retrieved from the Internet: URL: https://trezor.io/coins/.

"YubiKey", Wikipedia, 3 pages. Retrieved from the Internet on Sep. 29, 2021. URL: https://en.wikipedia.org/wiki/YubiKey.

Karst, et al., "Connecting Multiple Devices with Blockchain in the Internet of Things", Jan. 5, 2017, 23 pages. Retrieved from the internet: URL:https://courses.cs.ut.ee/MTAT.03.323/2016_fall/uploads/Main/002.pdf.

Lind, et al., "Teechan: Payment Channels Using Trusted Execution Environments", ARXIV.org, Cornell University Library, Ithaca, NY, Dec. 22, 2016, 15 pages.

Miller, et al., "Phonon Network Specification", GitHub, 10 pages. Retrieved from the Internet on Jun. 10, 2019: URL: https://github.com/GridPlus/phonon-network.

Poon, et al., "The Bitcoin Lightning Network: Scalable Off-Chain Instant Payments", Jan. 14, 2016. Retrieved from the Internet: URL: https://lightning.network/lightning-network-paper.pdf.

Veenstra, et al., "Phonon Network Specification", GitHub, 8 pages. Retrieved from the Internet on Sep. 16, 2020: URL: https://github.com/GridPlus/phonon-network.

Erdene-Ochir, O., "Patent Cooperation Treaty International Preliminary Report on Patentability dated May 23, 2024", Patent Cooperation Treaty Application No. PCT/US22/79645, Patent Cooperation Treaty, May 23, 2024.

\* cited by examiner

ABSTRACTION DATA 154

SIGNED GENERAL DATA 502

| CERTIFICATE AUTHORITY SIGNATURE 504 | <CA_ABS_PUB_KEY1> |

GENERAL DATA 156

```
PROTOCOL IDENTIFIER:  XKC
IDENTIFIER:"XKC"= FRIENDLY NAME: "XKCOIN"
ICONFILE:LOGO:FDSIMAGE

PROTOCOL IDENTIFIER:  BTC
IDENTIFIER:"BTC"= "BITCOIN"
ICONFILE:LOGOBTCICON
```

SPECIFIC DATA 158

```
PROTOCOL IDENTIFIER:  XKC
     SOURCEADDR: "6D6F6E65796D6F766573" = "PERSONAL ACCOUNT 3"
     DESTADDR: "908AFJKJHA9032809GKG098A3"= "BLAKE'S ACCOUNT"
     DESTADDR: "746F6D7269636861726478787"= "TEDDY"
     DESTADDR: "796574616E6F746865727065"= "BURRITO PALACE"

PROTOCOL IDENTIFIER:  BTC
     SOURCEADDR: "1F1TAAZ5X1HUXRCNLBTMDQCW6O5GNN4DAY" =
"VACATION RAINY DAY"
     DESTADDR: "BC1QX3LDHKALHMKKAETMLFRNQLNLNAKRR2NAVGQGN8"= "CAR
DEALERSHIP"
     DESTADDR: "71S4PBLJTPFHPS7R8RXMDEDDLXGSI3ZQSQ"= "DR. E.
HUER"
```

ABSTRACTED REQUEST DATA 160

```
Friendly Name: "XKCoin"
//serializing the transaction data
AssetAddress: "Personal Account 3"
DestinationAddress: "Blake's Account"
Value: "27"
...
```

FIG. 5

SYSTEM FOR SECURE MULTI-PROTOCOL PROCESSING OF CRYPTOGRAPHIC DATA

INCORPORATION BY REFERENCE

U.S. patent application Ser. No. 16/057,290 filed Aug. 7, 2018 and titled "System for Secure Storage of Cryptographic Keys" is hereby incorporated by reference in its entirety.

U.S. patent application Ser. No. 16/440,870 filed Jun. 13, 2019 and titled "Dynamic Off-Chain Digital Currency Transaction Processing" is hereby incorporated by reference in its entirety.

BACKGROUND

An increasing number of systems rely on cryptographic secrets, such as private keys, for operation. For example, these systems may be used to securely store data, identify a particular individual or item, exchange value, and so forth.

BRIEF DESCRIPTION OF THE DRAWINGS

FIG. 5 illustrates block diagrams of abstraction data and abstracted request data that may be used by a secure user interface to present secure output that facilitates user readability, according to one implementation.

Figure 1:
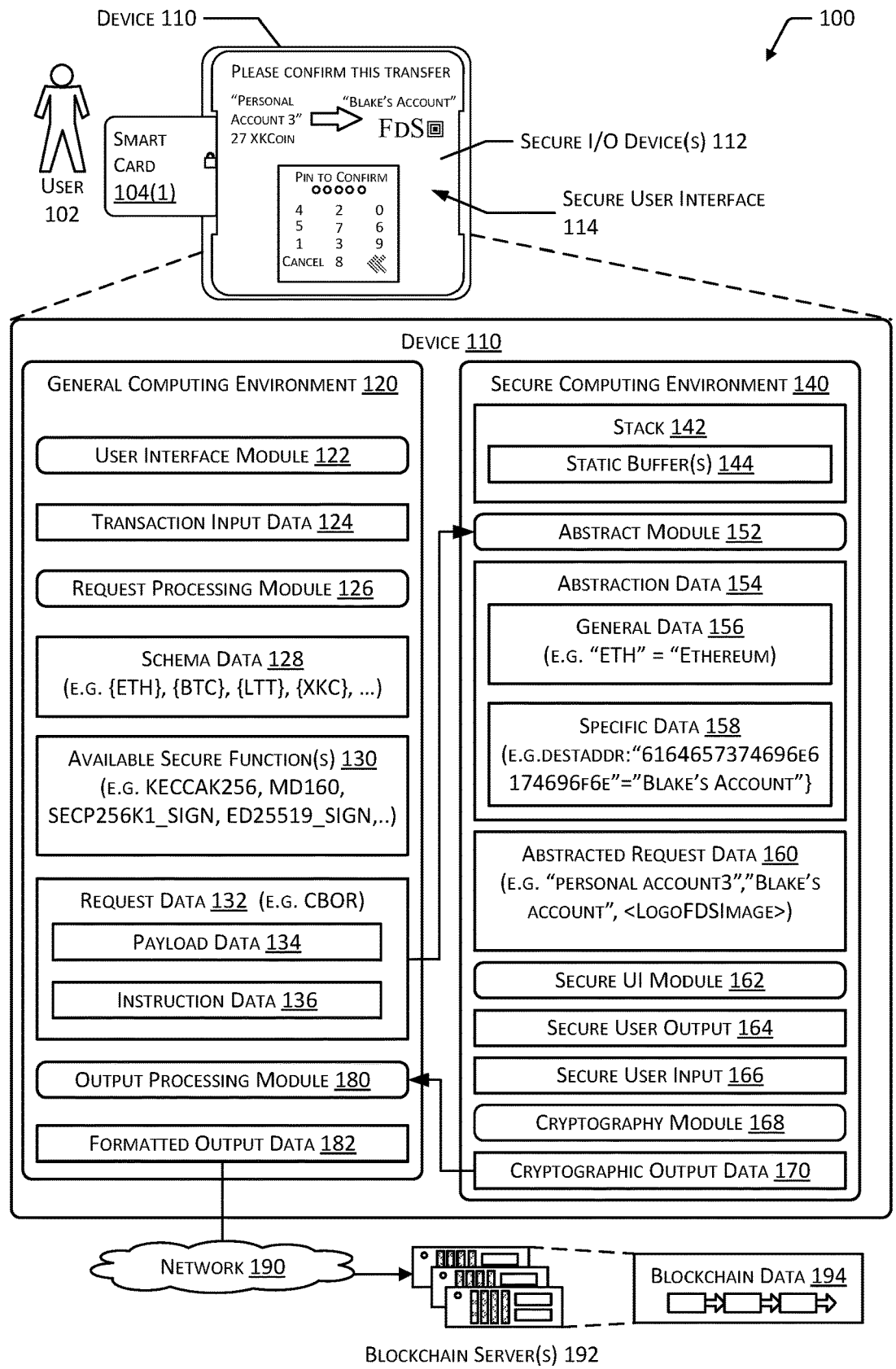
FIG. 1 depicts a system that utilizes a general computing environment and a secure computing environment to provide secure multi-protocol processing of cryptographic data, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Cryptography and cryptographically based systems are critical to a wide variety of systems. For example, cryptography may be used to prevent disclosure of information to unintended parties, to provide digital signatures that assert the authenticity of a message, and so forth. Cryptographic data may include private keys used to provide a digital signature, to encrypt information, and so forth. The cryptographic data and one or more data processing functions are used to compose a message.

Systems such as distributed ledgers (or "blockchains") may utilize digital signatures to sign such messages that represent blockchain transactions that, if validly signed, would result in updates to the distributed ledger that indicate transfers of tokens from one account to another. At any given time, a token is only associated with one cryptographic key pair. In some implementations, tokens may be used to represent assets. Blockchains provide for a decentralized, distributed trustless system, allowing participants to transfer value, participate in smart contracts, and so forth. For example, cryptocurrencies such as Bitcoin, Ethereum, Iota, Zcash, Monero, Cardano, and so forth utilize blockchains to operate. Digital cryptographic signatures (signatures) are used to determine if a message describing a proposed transaction is authentic, and whether the transaction is valid. A message is deemed to be authentic if the corresponding signature was produced using a specific private key. A transaction is deemed to be valid if the key pair is associated with sufficient balance as indicated in the global ledger or privilege as indicated in the global ledger to execute the transaction on the global ledger. For example, a message describing a transaction may be digitally signed with a private key using a cryptographic function. The private key is intended to remain known only by the party authorized to permit the transaction. Continuing the example, a message describing a transaction to transfer a specific amount of cryptocurrency from a source address that is derived from the signer's private key to a destination address may be digitally signed by the holder of the source private key. The message is then sent to one or more blockchain servers. A blockchain server receives the message and checks the digital signature. If the digital signature is authentic and valid, the blockchain server may proceed to process the message and commit the data in the message into the data of the blockchain. In some situations, the particular blockchain system may perform various checks prior to committing the data, such as waiting until a consensus among other blockchain servers has been reached. These checks establish a shared set of conditions (such as ensuring sufficient balance of the cryptocurrency sender) and are outside the scope of the signature itself.

A cryptographic system is generally deemed to be secure only so long as the secrets that are used as inputs to the cryptographic functions are maintained in secret. For example, Alice may use a private key value known only to her to produce signatures for her cryptocurrency. If Alice's private key value (which is usually a very large, random number) is ever compromised, such as through physical or electronic theft, carelessness, and so forth, an adversary could then use that private key value to generate authentic digital signatures. If this key were associated with cryptocurrency balances on one or more networks, signing transactions to move those cryptocurrencies would be both authentic and valid. As a result, the adversary could perform actions as if they were Alice, including stealing the cryptocurrencies associated with her private key.

The resistance of a cryptographic system to attack is also proportionate to the size of the private key used. As a result, longer private keys are preferred. The private keys may also be random values. The length, random nature, and so forth may make it difficult or impossible for a user to remember a single private key. The situation becomes untenable when a user may have many private keys. For example, Alice may have a private key for her personal Bitcoin account, a private key for her personal Ethereum account, a private key for her business Ethereum account, and so forth.

Traditional systems have attempted to mitigate these problems by keeping the private key data offline. Physical media such as paper or devices that are "air gapped" and do not remain connected to a network may be used. For example, a cryptocurrency user may print the private key on paper and place it in a bank vault, or store the private key on a removeable memory device. However, the paper can be stolen or destroyed. Removeable memory devices such as "flash drives" may fail, be damaged, be lost, or get stolen. However, by rendering the private keys inaccessible to a network, they become significantly harder to use. Additionally, physical theft still remains a possibility, and physical loss due to fire, flood, or other disaster may result in loss of private keys stored using these methods. Such systems also impose significant physical limitations. For example, the amount of private key data that can be printed on a sheet of paper is limited, as is the memory of a single device.

A device may be used to provide secure storage of secrets such as private keys and their use to compose messages. A device may be placed at a facility, such as a user's home. For example, a device known as a "hardware wallet" or "cryptocurrency wallet" may be used to store secrets, perform some predefined instructions using particular cryptographic functions, and so forth. Traditional devices suffer from several drawbacks including limited operability with respect to composition and poor user interfaces that leave users susceptible to fraud or errors.

Many devices are limited in the number of different assets that they are able to simultaneously support because the composition of a message that utilizes cryptographic functions are fixed within those devices. For example, traditional hardware wallets are limited in the number of different protocols they support to interact with their respective blockchains. Such limitations may result from variations present in the composition of messages that are compliant with those different protocols. For example, each protocol may have different information being processed, may serialize information in different ways, may have different ways of representing the same type of information such as a source address, and so forth. As a result, due to the limited computational and memory resources of a traditional hardware wallet, the ability to maintain information about how to process and present information about these different protocols is limited. Without this information, information about a transaction is likely incomprehensible to a user. As a result, a significant possibility exists that a user may complete a transaction that differs from what they intended.

This limited ability to compose messages poses a substantial usability problem as the number of assets utilizing cryptographic data continues to grow, each potentially using a different protocol requiring different functions to be performed to compose a message compliant with that protocol. For example, a hardware wallet that only supports the protocols for three cryptocurrencies at any one time has very limited utility to a user who is using four cryptocurrencies. At the time this disclosure was prepared, there were over 12,000 cryptocurrencies. Many more systems rely on cryptographic data, such as non-fungible token (NFT) blockchains, multi-factor authentication systems, and so forth. Many of these use different protocols, specifying different message format, grammar, syntax, and so forth. As a result, traditional solutions to provide for secure handling of cryptographic data are unable to facilitate interoperability with the every-growing number of systems using this cryptographic data. This substantially curtails usability of these traditional devices.

Described in this disclosure are techniques that allow for a device that includes a secure computing environment (SCE) to compose at least a cryptographically secure portion of messages for an extremely wide range of protocols and the composition of messages that are compliant with those protocols. A general computing environment (GCE) may receive transaction input data that indicates a transaction, such as a transfer of value from one cryptocurrency account address to another. In one implementation, the same device may include both the SCE and the GCE. In another implementation, a first device may include the GCE, a second device includes the SCE, and the two devices are in communication with one another. For example, the first device that includes the GCE may comprise a cellphone, laptop, tablet computer, or other device that is in communication with the second device that includes the SCE. In one implementation, a browser extension, mobile application, or other module executing on the GCE may use an application programming interface (API) to interact with the SCE.

The GCE maintains schema data that provides information about the requirements for protocols that are supported by the SCE. The information in the schema may include one or more of message format, grammar, syntax, and so forth. A protocol may be deemed to be supported if the underlying SCE is able to perform the functions required to compose at least a cryptographic portion of a message associated with that protocol. For example, if the protocol for the (fictional example) "XKC" cryptocurrency uses the Keccak256 algorithm and the SECP256k1 ECC signing curve to compose a message, and the SCE is able to perform these functions, the SCE may be deemed to support transactions on the XKC blockchain. Continuing the example, if the "XKC" protocol requires signed messages to begin with "helloworld" the schema data associated with "XKC" would include this information.

In some implementations, responsive to a message from a previously paired device, one or more of a version number, smart card identifier, list, or other information that is indicative of the functions supported by the SCE may be returned to the paired device.

The transaction input data is processed to determine request data. The request data may comprise payload data and instruction data. The payload data comprises the input to be operated on to compose a message, and the instruction data specifies a set of instructions that operate on the payload to compose a message that is compliant with one or more protocols. The payload data and the instruction data are suitable for processing by the SCE. In some implementations, the schema data may be used to process the transaction input data and determine the request data. The instruction data may comprise a script that complies with a specified scripting language. In some implementations, the request data may be formatted as a concise binary object representation (CBOR). The request data is then sent to the SCE. For example, the GCE may use an API to interact with the SCE.

Within the SCE, the request data is processed to compose at least a portion of a message. For example, responsive to the instructions provided in the instruction data and operating on one or more values in the payload data, cryptographic output data is generated. Continuing the example, this may include performing one or more operations such as serialization, cryptographic signing operations, memory operations, cryptographic transformation operations, and so forth. In some implementations, the instruction data may comprise a script, and the processing of the instruction data may comprise an interpreter module processing the script. In some implementations, the SCE may utilize a stack-based architecture in which static buffers are specified to limit potential adverse exploits of arbitrary code execution. As discussed below, a secure output device of the SCE may be used to present information about the request data. This allows the user the opportunity to view details about the request data. A secure input device of the SCE may be used to accept input that is indicative of approval to proceed with processing the request data using the SCE to determine the cryptographic output data. The resulting cryptographic output data may be returned to the GCE.

Based on the schema data, the GCE may then process the cryptographic output data to determine formatted output data. Continuing the example, the formatted output data may comprise the cryptographic output data after having been rearranged, reformatted, or otherwise processed to comply with the desired protocol, such as the "XKC" protocol. This formatted output data may then be sent to a blockchain server or other device for further processing, such as inclusion in the blockchain as a finalized transaction.

By using these techniques, the system is able to process a transaction in any protocol that utilizes functions available within the SCE. This may also reduce the necessary cost or complexity of one or more portions of the SCE. For example, compared to other approaches, by using the GCE to generate request data, and the SCE to process the request data, an SCE with lesser memory requirements and corresponding lower cost may be used. Continuing the example, an application programming interface (API) call may be made by the GCE to the SCE. In another example, by using the GCE to generate the request data, the SCE may be less complex, less expensive, consume less electrical power, and so forth. Continuing the example, the functions associated with composition may be performed by a processor within a smart card.

The usability and security of a device may also be improved by providing more robust and user-friendly information with a secure user interface. The SCE may include secure input/output (I/O) devices, such as a touchscreen that includes a display and a touch sensor. The SCE may present information about a pending transaction represented by the request data on the display to allow a user to confirm the transaction. If the user agrees to process the pending transaction, secure user input may be acquired using the touch sensor and confirmed as valid input. For example, the user may enter a passcode value. If the entered passcode value matches a passcode previously stored in the SCE, the input may be deemed to be valid input. Responsive to the valid input, the SCE may complete the processing to determine the cryptographic output data.

However, improper transactions may result if a user is mistaken or misled to approve a transaction that differs from their intention. The information associated with cryptographic data is seldom user-friendly. For example, cryptocurrency addresses may be long strings of nonsensical values to a human user. Many users would find it impossible to memorize these addresses, much less confirm their accuracy. For example, are these two addresses the same?

(Address 1) "0x4371a3a44435332c36ea634ed4c5b29 dfcc3c890"
(Address 2) "0x4371a3a44435332c36ee634ed4c5b29 dfcc3c890"

Address Example 1

If a user is conducting a transaction involving cryptographic data, assurance that they are performing the intended transaction is useful. Aside from keys, hashes, and other values, with over 12,000 cryptocurrencies, it may be problematic to remember or even discern a difference between "XKC" and "XKD" as presented on a display, particularly if the display is small, the font is difficult to read, and so forth. This problem is exacerbated if additional language glyphs are used. For example, a user who reads only English may not readily appreciate the difference between two glyphs in Hangul, such as:

(Hangul 1) ㅐ
(Hangul 2) ㅒ

Glyph Example 1

As described in this disclosure, abstraction data may be used to process the request data and determine abstracted request data. The abstraction data may be stored within the SCE and provides an association between particular data that may be present in the request data and predetermined or programmatically determined data suitable for user presentation. For example, the cryptocurrency identifier of "XKC" may be associated with "XKCoin" and a corresponding logo. During presentation on the secure output device, instead of only the text "XKC" the display may show "XKCoin" and the corresponding logo. Similarly, specified addresses may be replaced with specified strings, such as "Blake's Account" for presentation on the secure output device. As a result, presentation using the abstracted request data provides a more "user-friendly" output that is more meaningful to the user and improves the ability of a user to determine if the transaction is what they intend. As a result, overall assurance in operation of the system is improved. The abstraction data may be provided from an external source, entered using the secure input device, and so forth.

By using the techniques and systems described in this disclosure, secure processing of cryptographic data is facilitated. The use of the schema data and request data allows a variety of different cryptographic protocols to be supported by a single SCE.

Illustrative System

FIG. 1 depicts a system 100 comprising a device 110 that utilizes a general computing environment (GCE) 120 and a secure computing environment (SCE) 140 to provide secure multi-protocol processing of cryptographic data, according to one implementation.

The GCE 120 includes a processor, memory, and a network interface. The GCE 120 is discussed in more detail with regard to FIG. 2. In comparison, the SCE 140 may include one or more of a dedicated processor or cryptoprocessor, and also includes secure encrypted memory, input devices, output devices, and tamper detection devices or countermeasures. The SCE 140 is discussed in more detail with regard to FIG. 2.

The SCE 140 may include, or have an interface allowing connection to, one or more smart cards 104. The smart card 104 may include secure encrypted memory, a cryptoprocessor, antitamper devices, and so forth. Cryptographic data or other secrets, such as one or more private keys may be stored in the secure encrypted memory. The device 110 may allow for secrets such as private keys to be stored within the SCE 140, including the secure encrypted memory of the smart cards 104 connected thereto.

The smart card 104 may comprise secure encrypted memory that is secured using a physically unclonable function (PUF), with the PUF being inherent to that individual smart card 104. The smart card 104 is discussed in more detail with regard to FIG. 2. In some implementations, the smart card 104 may be a removeable device, may be a non-removeable device, or may otherwise be integrated into the SCE 140.

The SCE 140 utilizes a secure operating system (OS) and implements controls over transfer of data to the GCE 120. In addition to being separate from the GCE 120, the SCE 140 may respond to attempts to compromise the system. For example, an unauthorized communication with the SCE 140 may result in the contents of the secure encrypted memory being erased. In another example, an attempt to physically tamper with the SCE 140 may be determined by one or more tamper detection devices. Upon determining the physical tamper attempt, the SCE 140 may erase the contents of the secure encrypted memory, self-destruct, or take other actions.

In some implementations, the SCE 140 may use one or more stack(s) 142. These stack(s) 142 may comprise one or more static buffer(s) 144. The stack(s) 142 may be predefined, with specified static buffer(s) 144 such as a data payload buffer 144(1), a stack buffer 144(2), a working register buffer 144(3), and so forth. The static buffers 144 may be the same size, or may differ in size from one another. The buffers are considered static if their size is specified in advance and may not be changed during processing of request data 132. The enforcement of predefined static buffers 144 may be used to mitigate or eliminate adverse execution of arbitrary code included in the SCE 140. In other implementations, other techniques may be used instead of, or in addition to, the static buffers 144. For example, a shadow stack may be maintained and used.

To further maintain security, the SCE 140 or other components, such as the smart card 104, may be configured to preclude some operations outright. For example, the smart card 104 may be prohibited from sending a secret 242 in cleartext. Such prohibitions may be enforced through the absence of commands to perform such operations, through explicit instructions, or a combination thereof.

Data and capabilities of the smart cards 104 may be accessed while the smart card 104 is operating as part of the SCE 140. For example, the device 110 may connect to a smart card 104(1). Once connected, the SCE 140 may utilize secrets stored in the secure encrypted memory of the smart card 104(1), utilize cryptographic functions that a cryptoprocessor of the card is capable of executing, and so forth.

The SCE 140 provides one or more secure input/output (I/O) devices 112 that may be used to provide a secure user interface 114. For example, the SCE 140 may include a touchscreen that incorporates a display and a touch sensor, allowing for the presentation of data to a user 102 and acquiring input from the user 102. In some implementations, the input device may acquire biometric data, including but not limited to fingerprint data, palmprint data, iris data, and so forth. The I/O devices 112 allow the SCE 140 to accept input such as pairing codes, passcodes, biometric data, address data, abstraction data, or other data in a way that is deemed highly secure and is independent of the network that the GCE 120 is connected to. For example, the input provided via the secure input devices may be used for second factor verification.

The GCE 120 may include a user interface module 122. The user interface module 122 may use one or more I/O devices, another device, or a combination thereof to present a user interface (not shown) to the user 102. During operation, the device 110 may determine transaction input data 124. In one implementation, the transaction input data 124 is received from an external device via a communication interface of the GCE 120. In this implementation, the transaction input data 124 may comprise a message that is compliant with a particular protocol. For example, the GCE 120 may be used to receive transaction input data 124 representative of a transaction using the Ethereum blockchain.

In another implementation, the transaction input data 124 may be generated based on user input acquired using a user interface presented by the user interface module 122. For example, the user 102 may use the user interface module 122 to enter information about a desired transaction.

A request processing module 126 in the GCE 120 accepts the transaction input data 124 as input. Based at least in part on schema data 128 and, in some implementations, available secure functions 130, the request processing module 126 determines request data 132. The schema data 128 may be used to parse or otherwise process the transaction input data 124 to determine particular fields, values, instructions, and so forth that are expressed within the transaction input data 124. In some implementations, the schema data 128 may specify the grammar, syntax, location, format, and so forth of various elements for a particular protocol. The request data 132 may comprise a script that complies with a specified scripting language that may then be interpreted and executed by the SCE 140.

Available secure functions 130 may comprise information indicative of the capabilities of the SCE 140 or portions thereof to process data. For example, the SCE 140 may send to the GCE 120 information indicative of a set of data manipulation functions and cryptographic functions that are supported by the smart card 104 that is currently connected to the SCE 140. Different SCEs 140 or portions thereof such as different smart cards 104 may support different cryptographic functions, memory operations, and so forth.

In some implementations, the request processing module 126 may determine if the SCE 140 is able to support processing of a particular schema. For example, the transaction input data 124 may specify a transaction for the XKC cryptocurrency. The schema data 128 associated with the cryptocurrency is retrieved and indicates that the Keccak256 algorithm is used. The request processing module 126 may check that the available secure functions 130 include the Keccak256 algorithm. If so, the process may proceed. If not, an error notification may be presented.

The request data 132 comprises information, such as operations, inputs, and so forth that are associated with utilization of one or more of the available secure functions 130, use of the secrets 242, and so forth. The request data 132 may be represented with a specified formatting to be processed by the SCE 140. For example, the request data 132 may be formatted as JavaScript Object Notation (JSON), concise binary object representation (CBOR), and so forth. This formatting may include some features to improve intelligibility for human operators viewing the data. As described below, the request data 132 may be presented by a secure output device of the SCE 140. Such presentation allows the user 102 the opportunity to confirm the transaction is as intended or cancel the transaction. A secure input device may be used to accept input indicative of confirmation, modification, cancellation, and so forth.

Within the SCE 140, an abstract module 152 may use abstraction data 154 to process the request data 132 and generate abstracted request data 160. The abstracted request data 160, or a portion thereof, may be presented using the secure user interface 114. The abstraction data 154 specifies a relationship between first data and second data that is deemed to be equivalent. For example, "XKC" may be associated with "XKCoin". In one implementation, the abstract module 152 may accept the request data 132 as input and execute one or more regular expressions (regexes) that are specified in the abstraction data 154 to produce the abstracted request data 160. The abstraction data 154 may specify fields, data types, conditional tests, and so forth. For example, the abstraction data 154 may associate a first string with a second string. In another example, the abstraction data 154 may associate a conditional test if a first string has a first value and a second string has a second value then a third value.

The abstraction data 154 may comprise one or more of general data 156 or specific data 158. The general data 156 may comprise information that is applicable to a plurality of users. For example, the general data 156 may associate the identifiers for various cryptocurrencies to a longer name. In another example, the general data 156 may associate the identifiers with specific images, such as a logo. In some implementations, as described below, the general data 156 may be provided from a source external to the SCE 140. For example, a trusted party may create general data 156 and distributed signed general data 156 that may be imported into the SCE 140. If the signature is deemed valid, the general data 156 may be stored and used within the SCE 140. In some implementations, the secure user interface 114 may be used to obtain valid secure input from the user 102 that authorizes the use of the general data 156.

The specific data 158 may comprise information that is applicable to a particular user or set of users. For example, the specific data 158 may associate an account address with a text string such as "Blake's account". In some implementations, the specific data 158 may be generated, or confirmed, using the secure user interface 114. For example, the secure user interface 114 may present the account address and a proposed text string. Valid secure input from the user 102 is received that authorizes the subsequent use of that specific data 158.

As mentioned above, the abstraction data 154 may specify conditions for multiple fields which must be met in part or in aggregate to determine the abstracted request data 160. For example, the general data 156 may specify that for an Ethereum transfer several specified fields must have specific values for the user 102 to trust that the message request they are signing with the SCE 140 is indeed an Ethereum transfer. For example, a key derivation path is used to specify a signing key which is used in a hierarchically deterministic (HD) wallet. In some implementations, the HD wallets may comply with one or more of the Bitcoin Improvement Proposals (BIP) such as BIP32, BIP44, and BIP49. The HD wallets may segregate keys used for various assets or blockchains based on the derivation path. A transaction involving Ethereum may involve creating a field specifying that derivation path that is specified by the tag "<derivationPath>" when making the request. The general data 156 may specify that to determine abstracted request data 160 that specifies "Ethereum transaction" the value associated with the tag "<derivationPath>" would be required to have a value of "m/44'/60'/0'/0/0" specifying that derivation path. In other examples, other protocols may specify chain identifiers (chain IDs) to distinguish between a mainnet that implements functionality for users and testnets that is used to test functionality. In one example involving Ethereum, the request data 132 may include a field called "<chainId>" which has the value of "1", indicating a mainnet chain.

In some implementations, the GCE 120 may utilize a value within a specified field to refer to a particular set of functions or operations. For example, the transaction input data 124 may have a field "<RequestData>" with a value of "EthereumTransfer" that refers to a set of available secure functions 130 to complete an Ethereum transfer transaction. The request data 132 and resulting abstracted request data 160 may include the text "Ethereum Transfer" if all of the associated conditions specified by the abstraction data 154 correspond to the request data 132 provided.

In some implementations, data indicative of a failure of the request data 132 to satisfy one or more of the conditions specified by the abstraction data 154 may be presented. For example, if the request data 132 specifies a chain ID indicative of a testnet, the secure user interface 114 may present "WARNING—TestNet Transaction".

A secure user interface (UI) module 162 provides the secure user interface 114. For example, the secure UI module 162 may execute within the SCE 140, using secure I/O devices 112. The secure UI module 162 may provide secure user output 164, such as presenting at least a portion of one or more of the abstracted request data 160, the request data 132, or other information or user interface elements using the secure output device(s). By providing the secure user interface 114, the system 100 allows the user 102 to confirm that the transaction is as intended. This mitigates problems associated with the user 102 approving a transaction that differs from what they intended. For example, by presenting information about the actual transaction to be performed, the user 102 may avoid inadvertently cryptographically signing data that differs from their expectation.

The secure UI module 162 may be used to determine secure user input 166, such as input acquired using the secure input devices 112. In some implementations secure user input 166 may be deemed to be valid upon entry of a passcode, biometric input, and so forth.

In some implementations, the transaction input data 124 may omit some information, or the user 102 may choose to change some part of the information that was received in the request data 132. For example, the transaction input data 124 may not specify a source account for a transfer. In another example, the transaction input data 124 may specify a particular value to be transferred. In any event, the secure UI module 162 may be used to present one or more of the abstracted request data 160 or the request data 132. The secure user interface 114 may be used to accept secure user input 166 to modify the request data 132 as originally received by the SCE 140. For example, if no source account is specified, the user 102 may be prompted through the secure user interface 114 to select a source account. In another example, the user 102 may decide to change the value of the transaction. Based on the secure user input 166, the resulting request data 132 may then be processed by a cryptography module 168.

The SCE 140 includes the cryptography module 168. The cryptography module 168 performs one or more cryptographic functions. These cryptographic functions may include, but are not limited to, cryptographic signing operations, memory operations, cryptographic transformation operations, and so forth. For example, cryptographic signing operations may accept input data and a private or public key and produce as output a digital signature. In another example, memory operations may comprise performing one or more mathematical operations such as addition, subtraction, division, memory manipulations such as concatenation, length determination, and so forth. In yet another example, cryptographic transformation operations may include encryption, decryption, hashing, and so forth. The cryptographic module 168 may support symmetric key encryption, public/private key encryption, and so forth. In some implementations, one or more of the cryptographic functions may be performed at least in part by the smart card 104. For example, a cryptographic processor (cryptoprocessor) on the smart card 104 may be used to generate a signature.

The cryptography module 168 processes the request data 132 or information based thereon, such as the abstracted request data 160, and determines cryptographic output data 170. For example, the cryptography module 168 may use the payload data 134 as input and perform one or more operations on that input as specified by the instructions in the instruction data 136 to compose the cryptographic output data 170.

The cryptographic output data 170 may be represented with a specified formatting for subsequent processing by the GCE 120. For example, the cryptographic output data 170 may be formatted as JSON, CBOR, and so forth. The cryptographic output data 170 is then sent to the GCE 120. The SCE 140 is discussed in more detail with regard to FIG. 2.

The GCE 120 receives the cryptographic output data 170 and, based on one or more of the transaction input data 124 or the schema data 128, determines formatted output data 182. For example, the transaction input data 124 may specify, or may be used to determine, a first protocol for the formatted output data 182. Responsive to this, the output processing module 180 uses the schema data 128 to format the cryptographic output data 170 consistent with the first protocol. The output processing module 180 may perform various operations such as populating a template specified by the schema data 128 with information included in the cryptographic output data 170. For example, a predefined header string may be prepended to the cryptographic output data 170.

The formatted output data 182 may then be used. For example, the GCE 120 may use a network 190 to send the formatted output data 182 to a blockchain server(s) 192. The blockchain server(s) 192 may process the formatted output data 182 and perform one or more operations with respect to blockchain data 194. In other implementations other operations may be performed. For example, the formatted output data 182 may comprise a digitally signed token used as part of a multi-factor authentication system that is sent to a device requesting that authentication.

In some implementations, the cryptographic output data 170 may be suitable for use without subsequent processing by the output processing module 180. In such implementations, the formatted output data 182 may be omitted and the cryptographic output data 170 may be used instead.

By using the systems and techniques described in this disclosure, the SCE 140 is able to support many different protocols that utilize functions supported by the SCE 140. The manipulations of cryptographic data are maintained within the SCE 140, providing a high level of assurance as to the security of the secrets and operations therein.

As described below, in some implementations, one or more of the functions or hardware described may be consolidated into a single device. For example, a smartphone may include an embedded secure encrypted memory equivalent to the smart card 104, include a secure computing environment (SCE), and so forth.

Figure 2:
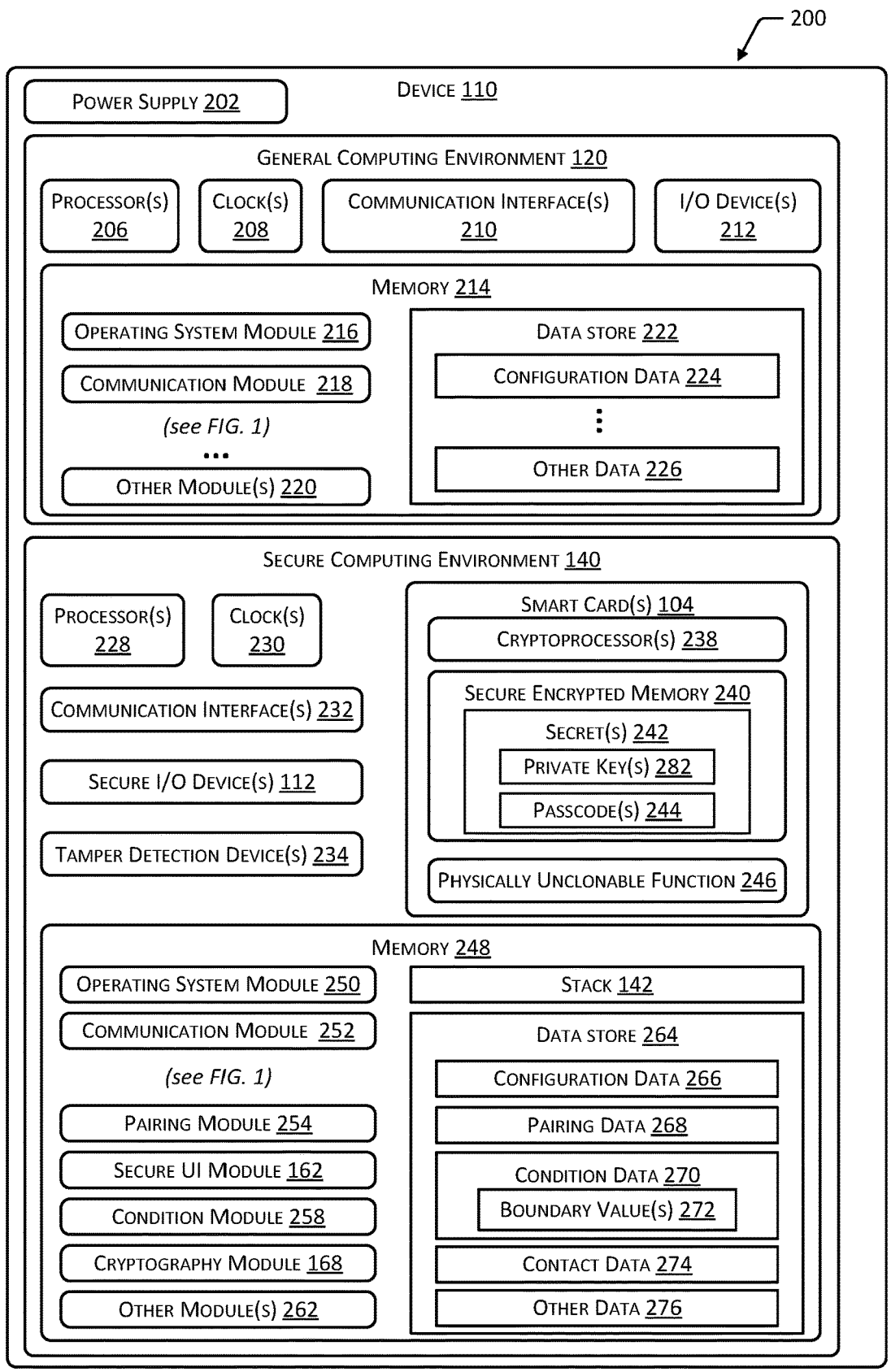
FIG. 2 illustrates a block diagram of the device, according to one implementation.

FIG. 2 illustrates a block diagram 200 of the device 110, according to one implementation.

The device 110 may include a power supply 202. For example, the power supply 202 may transform alternating current at a first voltage obtained from a household outlet to direct current at a second voltage. In some implementations other devices may be used to provide electrical power to the device 110. For example, power may be provided by wireless power transfer, batteries, photovoltaic cells, capacitors, fuel cells, and so forth.

The device 110 may comprise a general computing environment (GCE) 120. The GCE 120 may include one or more hardware processors 206 (processors) configured to execute one or more stored instructions. The processors 206 may comprise one or more cores. The processors 206 may include microcontrollers, systems on a chip, field programmable gate arrays, digital signal processors, graphic processing units, general processing units, and so forth. One or more clocks 208 may provide information indicative of date, time, ticks, and so forth.

The GCE 120 may include one or more communication interfaces 210. The communication interfaces 210 enable the GCE 120, or components thereof, to communicate with other devices or components. The communication interfaces 210 may include one or more of Inter-Integrated Circuit (I2C), Serial Peripheral Interface bus (SPI), Universal Serial Bus (USB) as promulgated by the USB Implementers Forum, RS-232, Ethernet, Wi-Fi, Bluetooth, Bluetooth Low Energy, ZigBee, or long-term evolution (LTE), and so forth. For example, the GCE 120 may include a Wi-Fi interface that allows the device 110 to communicate with the network 190, a Zigbee interface that allows the device 110 to communicate with other devices, and so forth.

The GCE 120 may include one or more I/O devices 212. The I/O devices 212 may include input devices such as one or more of a switch, keyboard, or touch sensor, and so forth. The I/O devices 212 may also include output devices such as one or more of a light, speaker, or display, and so forth. In some embodiments, the I/O devices 212 may be physically incorporated within the device 110 or may be externally placed.

As shown in FIG. 2, the GCE 120 includes one or more memories 214. The memory 214 may comprise one or more non-transitory computer-readable storage media (CRSM). The CRSM may be any one or more of an electronic storage medium, a magnetic storage medium, an optical storage medium, a quantum storage medium, or a mechanical computer storage medium, and so forth. The memory 214 provides storage of computer-readable instructions, data structures, program modules, and other data for the operation of the GCE 120. A few example functional modules are shown stored in the memory 214, although the same functionality may alternatively be implemented in hardware, firmware, or as a system on a chip (SoC).

The memory 214 may include at least one operating system (OS) module 216. The OS module 216 is configured to manage hardware resource devices such as the communication interfaces 210, the I/O devices 212, and provide various services to applications or modules executing on the processors 206. For example, the OS module 216 may implement a variant of the Linux operating system, such as FreeBSD. In other implementations, other operating systems may be used.

The memory 214 may store one or more of the following modules. These modules may be executed as foreground applications, background tasks, daemons, and so forth. For example, the memory 214 may store a communication module 218 and one or more other modules 220. The communication module 218 may be configured to use one or more of the communication interfaces 210 to facilitate communication between other devices and the SCE 140. For example, the communication module 218 may use a network interface to establish a connection to a WiFi wireless access point and exchange data with another device 110, blockchain servers 160, reputation servers, and so forth. The communication module 218 may facilitate communication between the SCE 140 and other devices. In some implementations the communication module 218 may provide for encrypted communications with the network interface. The OS module 216, the communication module 218, or other modules 220 may provide additional functions such as network security, denial of service, attack mitigation, port scanning detection, and so forth. In the event a potential attack is detected, the GCE 120 may take mitigating actions. For example, the GCE 120 may temporarily disconnect network access, acquire a new network address using a dynamic host configuration protocol, suspend communication with the SCE 140, and so forth.

Also included within the memory 214 are the modules discussed with respect to FIG. 1, including the user interface module 122, the request processing module 126, and the output processing module 180.

Also stored in the memory 214 may be a data store 222. The data store 222 may use a flat file, database, linked list, tree, executable code, script, or other data structure to store information. The data store 222 may include configuration data 224. For example, the configuration data 224 may include connection parameters for the network interface. Other data 226 may also be stored in the memory 214. Also stored within the memory 214 is the data discussed with respect to FIG. 1, including the transaction input data 124, the schema data 128, the available secure function(s) 130 information, the request data 132, and the formatted output data 182.

The device 110 comprises the secure computing environment (SCE) 150. The SCE 140 may include one or more hardware processors 228 (processors) configured to execute one or more stored instructions. The processors 228 may comprise one or more cores. The processors 228 may include microcontrollers, systems on a chip, field programmable gate arrays, digital signal processors, graphic processing units, general processing units, and so forth. One or more clocks 230 may provide information indicative of date, time, ticks, and so forth.

The SCE 140 may include one or more communication interfaces 232. The communication interfaces 232 enable the SCE 140, or components thereof, to communicate with other devices or components. The communication interfaces 232 may include one or more of I2C, SPI, USB, RS-232, secure digital host controller (SDHC), smart card interface, or near-field communication (NFC) interface, and so forth. In some implementations, communication between the GCE 120 and the SCE 140 may be limited to a particular communication bus, such as SPI or USB.

The SCE 140 may include one or more secure I/O devices 112. The secure I/O devices 112 may include secure input devices such as one or more of a switch, keyboard, or touch sensor, and so forth. The secure I/O devices 112 may also include secure output devices such as one or more of a light, speaker, or display, and so forth. For example, the secure I/O devices 112 may include a touchscreen that incorporates a display and a touch sensor, allowing for the presentation of data and acquisition of input. These secure I/O devices 112 may be constrained such that they may only be accessed by the SCE 140, and not the GCE 120.

The SCE 140 provides security against algorithmic and physical forms of intrusion. For example, the separation between the GCE 120 and the SCE 140, as well as other attributes of the SCE 140, minimizes the likelihood of success of an algorithmic attack. To guard against physical attack, the SCE 140 may include, or be in communication with, one or more tamper detection devices 234.

The tamper detection devices 234 provide data indicative of actual or potential tampering with the SCE 140 or elements therein. For example, the tamper detection devices 234 may include switches that indicate that the case of the device 110 has been opened. In another example, the tamper detection devices 234 and circuitry may include electrical conductors that, when broken, signal physical tampering. In another example, the tamper detection devices 234 may include sensors. For example, temperature sensors, light sensors, voltage measurement devices, magnetic field sensors, ionizing radiation sensors, ultrasonic sensors, and so forth may provide data that is indicative of tampering. The tamper detection devices 234 may be used to detect tampering of components that are part of a single die, a circuit board, an assembly, the SCE 140, and so forth. For example, the secure I/O devices 112 may include tamper detection devices 234.

In some implementations, the SCE 140 or portions thereof may be configured to self-destruct or otherwise be rendered unusable responsive to tampering. For example, responsive to a determination of tampering, voltage exceeding a threshold value may be passed through at least a portion of the circuitry in the SCE 140, rendering the circuitry unusable. In another example, responsive to a determination of tampering, storage media may be erased, overwritten, randomized, and so forth.

The SCE 140 may include one or more smart cards 104. The smart card 104 may be integral with the SCE 140, may be removeable, or may be wirelessly connected. The smart card 104 may include one or more of a cryptoprocessor 238 or a secure encrypted memory 240. For example, the cryptoprocessor 238 may be configured to provide one or more cryptographic functions. The secure encrypted memory 240 may be used to store one or more secret data 242, such as private keys 282, passcode 244 values, and so forth. The private keys 282 may include asset private keys. In some implementations the secrets 242 may include the cryptographic data.

Communication with the smart card 104 may be established using one or more electrical contacts, or wirelessly using electromagnetic radiation, magnetic fields, sound, and so forth. For example, the communication interfaces 232 may include an interface that requires electrical contact with the smart card 104 and is compliant with at least a portion of the International Organization for Standards (ISO) and International Electrotechnical Commission (IEC) ISO/IEC 7816 standard. In another example, the communication interfaces 232 may include a wireless interface that is compliant with at least a portion of the ISO/IEC 14443.

The smart card 104 may also include a physically unclonable function (PUF) 246. The PUF 246 may be based on some characteristic of the smart card 104 or a component therein that exhibits physical variation during fabrication. The PUF 246 may be used to produce data that is unique to that particular smart card 104, but is considered stable with respect to a specified range of environmental conditions. Physical variable features such as the distribution of coatings, arrangement of a crystalline lattice, arrangement of magnetic particles, and so forth may be used to generate the PUF 246. In some implementations, the PUF 246 may be used as a private key 282, or as random seed to generate a private key 282.

As shown in FIG. 2, the SCE 140 includes one or more memories 248. The memory 248 may comprise one or more CRSM. As described above, the CRSM may be any one or more of an electronic storage medium, a magnetic storage medium, an optical storage medium, a quantum storage medium, or a mechanical computer storage medium, and so forth. The memory 248 provides storage of computer-readable instructions, data structures, program modules, and other data for the operation of the SCE 140. A few example functional modules are shown stored in the memory 248, although the same functionality may alternatively be implemented in hardware, firmware, or as a system on a chip (SoC).

The memory 248 may comprise a stack 142. As described above, the stack 142 may comprise one or more static buffers 144. Various techniques may be used to prevent unwanted manipulation of data within the stack 142, such as using different static buffers 144 to store a data payload from the payload data 134, working registers, memory pointer values, and so forth.

The memory 248 may include at least one operating system (OS) module 250. The OS module 250 is configured to manage hardware resource devices such as the communication interfaces 232, the secure I/O devices 112, and provide various services to applications or modules executing on the processors 228. For example, the OS module 250 may implement a variant of the Linux operating system, such as Free BSD.

The memory 248 may store one or more of the following modules. These modules may be executed as foreground applications, background tasks, daemons, and so forth. These modules may include one or more of a pairing module 254, a secure UI module 162, a condition module 258, a cryptography module 168, or other modules 262.

Also stored in the memory 214 may be a data store 264. The data store 264 may use a flat file, database, linked list, tree, executable code, script, or other data structure to store information. The data store 264 may include one or more of configuration data 266, pairing data 268, condition data 270, boundary values 272, contact data 274, or other data 276. For example, the configuration data 266 may comprise settings associated with operation of the OS module 250, data indicative of the limits imposed by the communication module 252, and so forth.

The communication module 252 may use one or more of the communication interfaces 232 to provide communication between the SCE 140 and the GCE 120. The communication module 252 may implement mailbox functionality, restricting the type of data that may be transferred between the SCE 140 and the GCE 120. The communication module 252 may restrict communication based on frequency of data transfer, size of the data, type of data being transferred, implement a limited set of instructions, and so forth. For example, if the communication module 252 receives request data 132 from the GCE 120 that is too large, the communication module 252 may erase the request data 132. In another example, the communication module 252 may suspend communications when a number of messages per unit time exceeds a threshold value. In some implementations, if the communication module 252 or other module detects activity that exceeds one or more thresholds, mitigating actions may be taken. These mitigating actions may include, but are not limited to, erasure of the secure encrypted memory 240, rendering one or more components of the SCE 140 inoperable, and so forth. For example, if the number of invalid instructions processed by the communication module 252 exceeds a threshold count within a predetermined period of time, the secure encrypted memory 240 may be erased. Likewise, the communication module 252 may impose limits on outbound communication to the GCE 120.

The pairing module 254 may generate or update the pairing data 268. Pairing indicates an established and trusted relationship between the device 110 and another device or system. The other device may be another device 110. The pairing module 254 may be configured to participate in a pairing process. For example, the communication module 252 may receive message data from the GCE 120 that comprises data associated with pairing, such as a source identifier, a source address, a public key, and so forth. The communication module 252 passes the message data to the pairing module 254 for processing. The pairing module 254 may implement one or more techniques for pairing. For example, the pairing module 254 may utilize a Diffie-Hellman key exchange. In one implementation, a first device 110(1) may comprise the GCE 120 while a second device 110(2) may comprise the SCE 140. The first device 110(1) may be paired with the second device 110(2). After successfully pairing, the first device 110(1) may utilize the SCE 140 of the second device 110(2).

The secure UI module 162 provides the secure user interface 114 via the secure I/O devices 112 in the SCE 140. For example, the secure UI module 162 may accept user input from a secure input device to provide information that is absent from, or replace information in, the request data 132. The secure UI module 162 may present other user interfaces to perform other operations, such as pairing with another device, confirming transfer, and so forth.

During operation, some data may be transferred over the network 190, with the GCE 120 providing communication to the SCE 140 of the device 110. For example, the SCE 140 of the device 110 may use the communication capabilities of the GCE 120 to receive signed abstraction data from a server.

The condition module 258 may be used to assess incoming data, such as the request data 132 or other message data. The condition module 258 may assess values of the incoming data against one or more of the pairing data 268 or the condition data 270 and corresponding boundary values 272.

In some implementations, the condition module 258 may be configured to disregard all message data that is not associated with a paired device as indicated in the pairing data 268. For example, a paired device sends message data to the device 110 for signing. In another example, the condition module 258 may disregard traffic from devices other than those specified in proposal data that has been previously sent. The condition module 258 checks a source address, signature data, or other values in the message data to determine if the message data is associated with pairing data 268 indicative of a pairing that is still in force.

Each pairing, as indicated in the pairing data 268, may have one or more different rules or conditions associated with that pairing. These conditions may specify limits designated by the user 102, administrator, and so forth.

Continuing the earlier example, after determining a valid pairing exists, the condition module 258 then compares one or more other values of the message data to determine if they satisfy one or more of the conditions specified in the condition data 270. The condition data 270 may indicate particular fields of data and the corresponding boundary values 272 for those fields. For example, the field may be "type of currency" and the boundary value 272 may be "ETH".

The condition data 270 may be used to specify one or more of a type of asset that is permitted, a type of transaction that is permitted, a maximum number of signed messages within a specified interval of time, a maximum quantity of assets in a single transaction, a minimum quantity of assets in a single transaction, or a maximum quantity of assets transferred per interval of time, and so forth. In other implementations, other conditions may be specified with corresponding boundary values 272.

The conditions specified by the condition data 270 may include a requirement for verification by the user 102 before the cryptographic output data 170 is determined. For example, the secure UI module 162 may be used to accept input from the user 102 indicative of approval to digitally sign data. In one implementation, the input provided by the user 102 may comprise a passcode 244 that, when entered using the secure input device and subsequently validated, is used to access one or more of the private keys 282. For example, the passcode 244 may be used to authorize or otherwise indicate use of a "blind" private key 282. In another implementation, instead of or in addition to the passcode 244, a removeable smart card 104 may be required. With this implementation, the SCE 140 utilizes the removeable smart card 104 as a form of second factor authentication.

The cryptography module 168 performs one or more cryptographic functions. These cryptographic functions may include, but are not limited to, cryptographic signing operations, memory operations, cryptographic transformation operations, and so forth. For example, these may include private key generation, creation of one or more pieces of a private key 282 for sharing, hierarchically deterministic address generation, digital signing, hash generation, multiple signature signing, encryption, decryption, and so forth. For example, the cryptographic functions may include an implementation of secret sharing, such as described by Adi Shamir, George Blakely, and so forth, that allows for a secret 242 to be divided into several pieces that may then be distributed. The private key 282 may then be determined using the pieces, or a subset of those pieces. In another example, the cryptographic functions may produce, based on one or more of the private keys 282, a digital signature that is used to create the signed data.

In some implementations, one or more of the cryptographic functions may be performed at least in part by the smart card 104. For example, a cryptographic processor (cryptoprocessor) on the smart card 104 may be used to perform the cryptographic functions.

The memory 248 may store contact data 274. The contact data 274 comprises information about one or more participants or contacts that may be parties to a transaction involving the device 110. For example, the contact data 274 may comprise information such as the names and cryptocurrency addresses, pictures, and so forth of friends, family, vendors, and so forth that the user 102 wants to transfer assets to. In some implementations, the specific data 158 may comprise the contact data 274.

As described above, public key values, cryptocurrency addresses, and other data associated with transactions involving cryptography can be troublesome for the user 102 to deal with. Humans may have difficulty working with long sequences of letters and numbers. For example, humans may have difficulty discerning small differences between those strings, remembering a cryptocurrency address, and so forth.

As a result, there is the potential for the user 102 to incorrectly select one cryptocurrency address when another is intended, or otherwise introduce errors into the process of generating the signed data.

The abstracted request data 160, or a portion thereof, may be presented in the secure user interface 114. By presenting the abstracted request data 160, the user 102 is quickly and easily able to confirm their intent, and more easily determine unwanted or incorrect transactions. As a result, overall security of the system 100 is improved. In other implementations, the request data 132 may be presented in the secure user interface 114.

In some implementations, processing of the request data 132 by the SCE 140 may use a stack-based architecture with several static buffers to improve security. These static buffers may include one or more of a data payload buffer, a stack buffer, or a working register buffer. These buffers may be the same size, or may differ in size from one another. The buffer size is static in that it is specified in advance and may not be changed during processing of request data 132. In some implementations, the request processing module 126 may enforce limits on the determination of the request data 132 to enforce operation within these buffers. For example, the request processing module 126 may use the schema data 128 to determine request data 132 that comports with CBOR. In another example, the request processing module 126 may determine the request data 132 such that expected intermediate operations, data, and so forth that are associated with the generation of the cryptographic output data 170 will operate within the confines of the statically allocated buffers.

The other modules 262 may provide other functions.

In one implementation, the SCE 140 may comprise the Kinetis K81 microcontroller unit (MCU) from NXP Semiconductors N.V. of Eindhoven, the Netherlands. In other implementations, the SCE 140 may comprise other devices.

Figure 3:
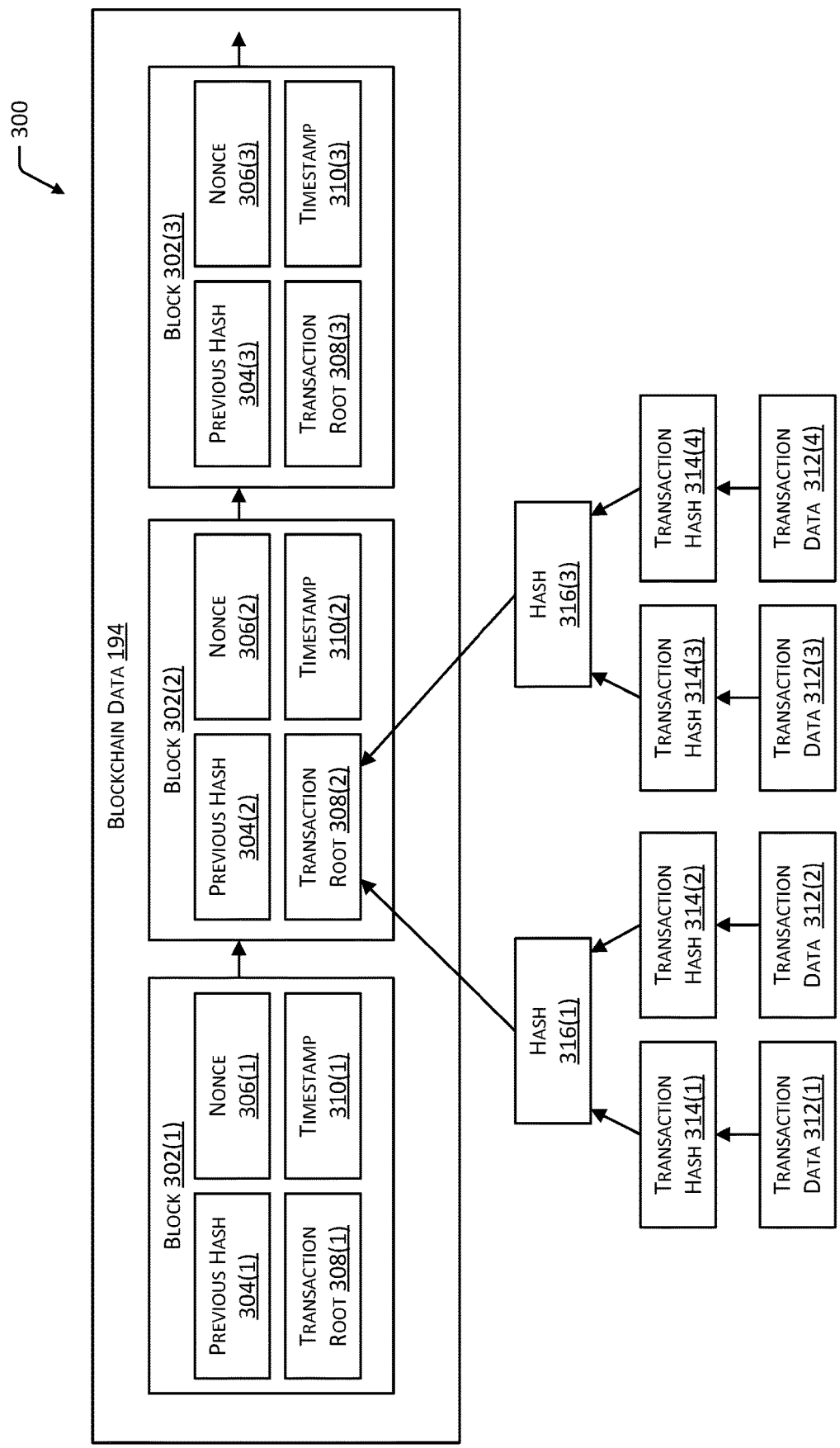
FIG. 3 illustrates blockchain data, according to one implementation.

FIG. 3 illustrates a portion 300 of blockchain data 194, according to one implementation. The techniques described in this disclosure allow for use of different protocols. Some of these protocols may involve transactions involving different distributed ledgers, also known as blockchains.

A blockchain comprises a system that utilizes a network of peers that provide distributed data storage and processing of blockchain data 194 that provides a canonical record. The blockchain data 194 maintains information about a current state as well as how that current state was arrived at.

To maintain a deterministic state at all times, data is recorded into the database in blocks 302(1), 302(2), 302(3), . . . , 302(B). Each block 302 comprises a block header that includes a previous hash 304, a nonce 306, a transaction root 308, and a timestamp 310. The block 302 may include payload data, such as details of a transaction, contract parameters, and so forth. In some implementations, the block 302 may include other data that facilitates proof and verification of the transactions which are contained in that block 302 as well as the precedence of the existence of that block 302 relative to other blocks 302 in the blockchain data 194. Blocks 302 are linked together over time by recording the previous hash 304 of the previous block 302 in the subsequent block 302. For example, block 302(2) includes the previous hash 304(2) that is derived from the data in the block 302(1). The previous hash 304 of a given block 302 may be constructed of a hash of data contained in the block 302 as well as a nonce 306 which forms a block hash which meets the requirements of consensus of the given blockchain.

Transaction data 312 is hashed to produce a transaction hash 314. A plurality of transaction hashes 314 may then be hashed again in a deterministic way with one another, such as using a Merkle tree, to form a hash 316, until they are all represented by a single hash 316 which is stored as the transaction root 308. The hashing process allows the verification of the existence of all transaction data 312 in a block 302 because the transaction data 312 can be shown to be part of the transaction root 308 recorded in the block header in the block 302. In some implementations, the transaction data 312 may include a message cryptographically signed by the current owner of an asset transferring the asset to another address. For example, the user 102 may use the device 110 to create, based on a private key stored in the smart card 104, the cryptographic output data 170 comprising a digitally signed message that is then used as transaction data 312 which is subsequently committed to the blockchain data 194. Continuing the example, the transaction data 312 may comprise at least a portion of the formatted output data 182. The transaction data 312 submitted to the blockchain servers 192 for processing comports with the protocol associated with that system.

The ownership of assets or other entities recorded by the blockchain data 194 is determined by the ability of a participant to cryptographically sign a message which moves assets from a first account to a second account. The ability to create the signed message data which will be honored by the blockchain servers 160 may be predicated on the ability to sign the message data with a private key 282 that corresponds to a source account or an address of the assets.

Figure 4:
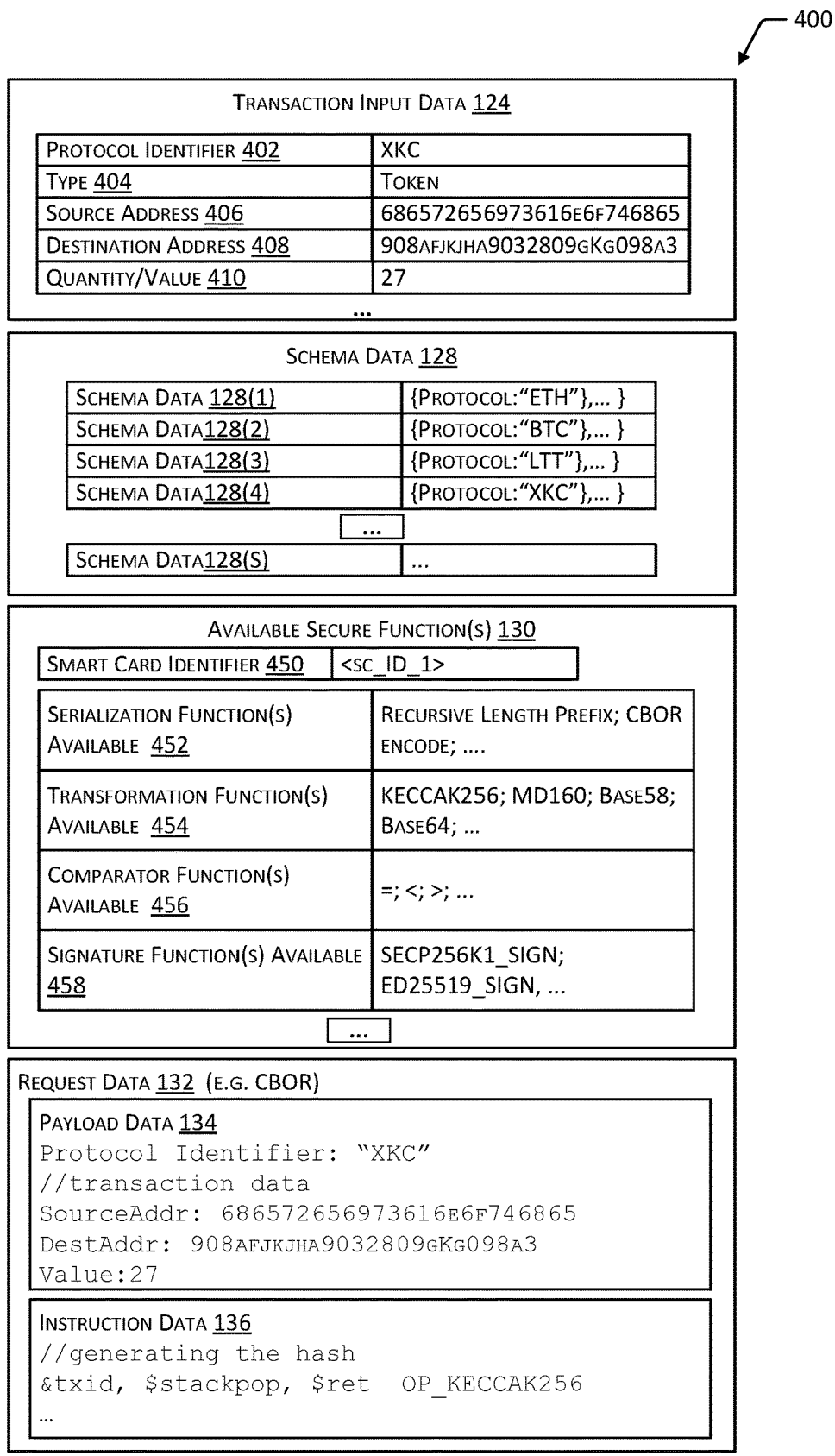
FIG. 4 illustrates block diagrams of data associated with operation of the system such as schema data and request data, according to one implementation.

FIG. 4 illustrates at 400 block diagrams of data associated with operation of the system such as transaction input data 124, schema data 128, available secure function(s) 130 information, and request data 132, according to one implementation. The data is depicted in a table format for ease of illustration, and not as a limitation. In other implementations other data structures may be used.

The transaction input data 124 may comprise information that is indicative of one or more transactions that utilize one or more cryptographic functions to complete. In this illustration, the transaction input data 124 may be representative of a cryptocurrency or other digital asset transfer, and comprises a protocol identifier 402, a type 404, a source address 406, a destination address 408, and a quantity or value 410. Other information may be included, but is not shown. For example, executable code associated with a smart contract may be included.

The schema data 128 may specify the grammar, syntax, location, format, and so forth of various elements for a particular protocol. For example, schema data 128(2) may specify the elements of data associated with a Bitcoin transaction, formatting, cryptographic operations required, data types, and so forth. The schema data 128 may also include information indicative of the cryptographic functions that are utilized. In some implementations the schema data 128 may include information such as the number base and precision of number values associated with that protocol.

The available secure function(s) 130 comprises information indicative of the capabilities of the SCE 140 or portions thereof. In some implementations, the available secure function(s) 130 may include information such as a smart card identifier 450, such as a serial number of a particular smart card 104, version number, hash value, or other information.

The smart card identifier 450 or other data may be used to specify or refer to the particular functions that are available within the SCE 140.

The available secure function(s) 130 may comprise information about functions that may be specified in the request data 132 to determine the cryptographic output data 170. For example, the determination of the cryptographic output data 170 may include the composition and signing of messages which adhere to specific end use definitions or protocols. Composition may comprise processing at least a portion of the payload data 134 in accordance with the instruction data 136 using at least a portion of the available secure functions 130.

The available secure function(s) 130 may include information that refers to functions such as serialization functions available 452, transformation functions available 454, comparator functions available 456, signature functions available 458, and so forth.

The serialization functions available 452 may support various serialization/deserialization operations such as recursive length prefix (RLP), CBOR, concatenation, and so forth that may be used during message composition. Examples of serialization commands that may be included in the request data 132 may include one or more of OP_RLP_ENCODE, OP_CBOR_ENCODE, OP_PUSH, OP_POP, OP_FLIP, OP_LENGTH, or OP_CONCAT, and so forth.

The transformation functions available 454 may include cryptographic transformations that may be applied to one or more parts of a payload or message during message composition. The transformation functions available 454 may support transformations such as cryptographic hashing algorithms such as SHA256, Keccack256, MD160, Base64, and so forth. Examples of transformation commands that may be included in the request data 132 may include one or more of OP_SHA256, OP_KECCACK256, OP_MD160, OP_SS58, OP_HEXTODEC, OP_DECTOHEX, or OP_BASE64, and so forth.

The comparator functions available 456 may include operations for comparison of data, such as "=", "<", ">", and so forth. Examples of comparator commands that may be included in the request data 132 may include one or more of OP_EQUAL, OP_LESSTHAN, or OP_GREATERTHAN, and so forth.

The signature functions available 458 may include cryptographic signature algorithms that may be used to cryptographically sign at least a portion of one or more of a payload or message during composition. The signature functions available 458 may support cryptographic signature algorithms such as elliptical curve digital signature algorithms (ECDSA) secp256k1, secp256r1, ed25519, and so forth. Examples of signature commands that may be included in the request data 132 may include one or more of OP_SECP256k1, OPSECP256R1, or OP_ED25519, et cetera which allow signatures to be made on some or all portions of the payload or message during composition.

The request data 132 may comprise payload data 134 and instruction data 136. The payload data 134 may comprise one or more values that may be used as input to or operands for composition of a message. For example, the payload data 134 may comprise a value of a source address, a value of a destination address, and so forth. The instruction data 136 comprises one or more instructions such as operators, instructions, values, and so forth that are associated with operating one or more of the processor(s) 228, or cryptoprocessor(s) 238, and so forth. In some implementations, the instruction data 136 may comprise a script that may be used to execute one or more of the available secure functions 130 on the cryptoprocessor 238, use of the secrets 242, input values for processing, and so forth.

In the implementation depicted here, the payload data 134 and the instruction data 136 are separate portions of the request data 132. In other implementations, the payload data 134 and the instruction data 136 may be intermixed.

The request data 132, or a portion thereof, may be represented with a specified formatting to be processed by the SCE 140. For example, the request data 132 may be formatted as JavaScript Object Notation (JSON), concise binary object representation (CBOR), and so forth. This formatting may include some features to improve intelligibility for human operators viewing the data.

The request data 132 may permit definition and use of tags that are specified by the GCE 120 and refer to data in the payload data 134. For example, the tags in the payload data 134 may comprise "<toAddress>", "<fromAddress>", "<chainId>", "<value>", and so forth. These tags can be referenced in the instruction data 136 to move data onto the stack 142 and then operate on the data using one or more of the available secure functions 130 to determine the cryptographic output data 170.

In some implementations, examples of the following request data 132, or portions thereof, may be used during operation of the system 100.

```
//Ethereum
{
 "Derivation Path" : " m/44'/60'/0'/0/0 ",
 "DestAddress" :
"0x818a2266c12b15d853de5adc2f2c6acc1d8920b7",
 "ChainId" : "<ID>",
 "Native encoding" : "RLP",
 "Transformation" : "keccak256",
 "Curve" : "secp256k1",
 "Payload" : "<encoded data>",
 "Value" : "0x01cba1761f7ab9870c",
 "Gas Price" : "0x1fe5d61a00",
 "Gas" : "0x34e97",
 "Data" : "0x17e...",
 "RSV" : {
  "r" : null,
  "s" : null,
  "v" : "0x01"
 },
 "Nonce" : "0x02"
}
```

Example 1

```
//Bitcoin
{
 "Derivation Path" : " m/44'/0'/0'/0/0 ", //Derivation Path
 "Dest Address" : "3Et5JhPaQrjTMVTq31p38ydbSwE6Q52xAb",
//Dest Address
 "ChainId" : "<ID>",
 "Native Encoding" : "BTC" //Native encoding
 "Transformation" : "base58" //Transformation
 "Curve" : "Secp256k1" //SigningCurve
 "Payload" : "<encoded data>" //Transaction Payload
 "Value" : "3.68" //Value
 "Transaction Fees" : "0.001" //Transaction fees
 "Data" : "" //Transaction data, user readable
}
```

Example 2

```
//Cardano
{
 "Derivation Path" : "m/44'/1815'/0'/0/0" , //Derivation
Path
 "Dest Address" :
"37btjrVyb4KDXBNC4haBVPCrro8AQSHbdCMp3RFhhSVWwfFmZ6wwzSK6JK1hY
6wHNmtrpTf1kdbva8TCneM2YsiXT7mrzT21EacHnPpz5YyUdj64na", //Dest
Address
 "ChainId" : "<ID>",
 "Native Encoding" : "CBOR"
 "Transformation" : "blake2b"
 "Curve" : "ed25519"
 "Payload" : "<encoded data>"
 "Value" : "3.68"
 "Transaction Fees" : "0.001"
 "Data" : ""
}
```

Example 3

```
{
"EIP155Mode" : "false",
"EIP155Mode" : 0,
"path" : {
 "pathDepth" : 5,
 "purpose" : {"u32" : 0x80000000 + 44},
 "coin" : { "u32" : 0x80000000 + 60},
 "account" : {"u32" : 0x80000000},
 "change" : {"u32" : 0},
 "addr" : {"u32" : 5},
},
"nonce" : 5,
"gasPrice" : 1000000000,
"gasLimit" : 100000,
"addrTo" : {
 "u8" : [
  0x76, 0x9f, 0x78, 0x37, 0x30, 0xe4, 0x99, 0x94,
0xf7, 0x24,
  0x06, 0x98, 0x98, 0xf8, 0x73, 0x8b, 0xfd, 0x40,
0x6d, 0xfd,
 ],
},
"value" : [
 0x00, 0x00, 0xf4, 0x44, 0x82, 0x91, 0x63, 0x45, 0x00,
0x00,
 0x00, 0x00, 0x00, 0x00, 0x00, 0x00, 0x00, 0x00, 0x00,
0x00,
 0x00, 0x00, 0x00, 0x00, 0x00, 0x00, 0x00, 0x00, 0x00,
0x00,
 0x00, 0x00,
],
"dataSz" : 6,
"data" : [
 0x01, 0x02, 0x03, 0x04, 0x05, 0x06,
],
"num_elements_to_encode" : 6,
"GARTscript" : [
 0x01, 0x02, 0x01, 0x02, 0x01, 0x02, 0x01, 0x01, 0x02,
0x01,
 0x01, 0x03, 0x04, 0x05, 0x00,
]
"GARTmap" : [
 "nonce", "gasPrice", "gasLimit", "addrTo", "value",
"data", "num_elements_to_encode",
]
}
<nonce> OP_STACK_PUSH,
OP_FLIP_BYTES,
<gasPrice> OP_STACK_PUSH,
OP_FLIP_BYTES,
<gasLimit> OP_STACK_PUSH,
OP_FLIP_BYTES,
<addrTo> OP_STACK_PUSH,
<value> OP_STACK_PUSH,
OP_FLIP_BYTES,
<data> OP_STACK_PUSH
<num_elements_to_encode> OP_STACK_PUSH
OP_RLP_ENCODE,
OP_KECCAK256,
OP_SECP256K1_SIGN,
OP_NOP
```

Example 4

FIG. 5 illustrates at 500 block diagrams of abstraction data 154 and abstracted request data 160 that may be used by the secure user interface 114 to present secure output that facilitates user readability, according to one implementation. The data is depicted in a table format for ease of illustration, and not as a limitation. In other implementations other data structures may be used.

The abstraction data 154 may comprise data that specifies a relationship between first data and second data. In some implementations, this relationship may be deemed to be semantically equivalent. For example, "XKC" may be deemed to be equivalent to "XKCoin". In some implementations the abstraction data 154 may comprise one or more regular expressions (regexes) and associated parameters. These regexes may be used to process the request data 132 to determine the abstracted request data 160 by selectively replacing strings present in the request data 132 with predefined strings.

The abstraction data 154 may comprise one or more of general data 156 or specific data 158. The general data 156 may comprise information that is applicable to a plurality of users. For example, the general data 156 may associate the identifiers for various cryptocurrencies to a longer name.

The specific data 158 may comprise information that is applicable to a particular user or set of users. For example, the specific data 158 may associate an account address with a text string such as "Blake's account". In some implementations, the specific data 158 may be stored within the secure encrypted memory 240 of a particular smart card 104. For example, the source addresses associated with private keys 282 stored within that secure encrypted memory 240 may be stored as specific data 158 in the secure encrypted memory 240.

In some implementations, the abstraction data 154 may be obtained from a source that is outside of the SCE 140. To reduce the likelihood of that abstraction data 154 being tampered with, the abstraction data 154 may be one or more of encrypted, digitally signed, and so forth. In this illustration, the general data 156 may be provided by an external service, such as a trusted provider as signed general data 502. The trusted provider may digitally sign the general data 156 to facilitate distribution and detect tampering with the general data 156. For example, the signed general data 502 may comprise the general data 156 being cryptographically signed using a certificate authorization signature 504 from a trusted certificate authority. If the digital signature is determined to be valid by the SCE 140, the general data 156 may be stored in the SCE 140 and subsequently used. If the digital signature is determined to not be valid, one or more actions may be performed such as deleting the general data 156, sending an error message, presenting a notification using the secure user interface 114, and so forth.

The abstracted request data 160 is based on the request data 132, as modified within the SCE 140 based on the abstraction data 154 to provide information that may be more intelligible to the user 102. For example, 64 bit hexadecimal addresses may be replaced with predefined strings that represent names or mnemonics, characters in a language other than a specified language may be replaced, highlighted, enlarged, and so forth.

Figure 6:
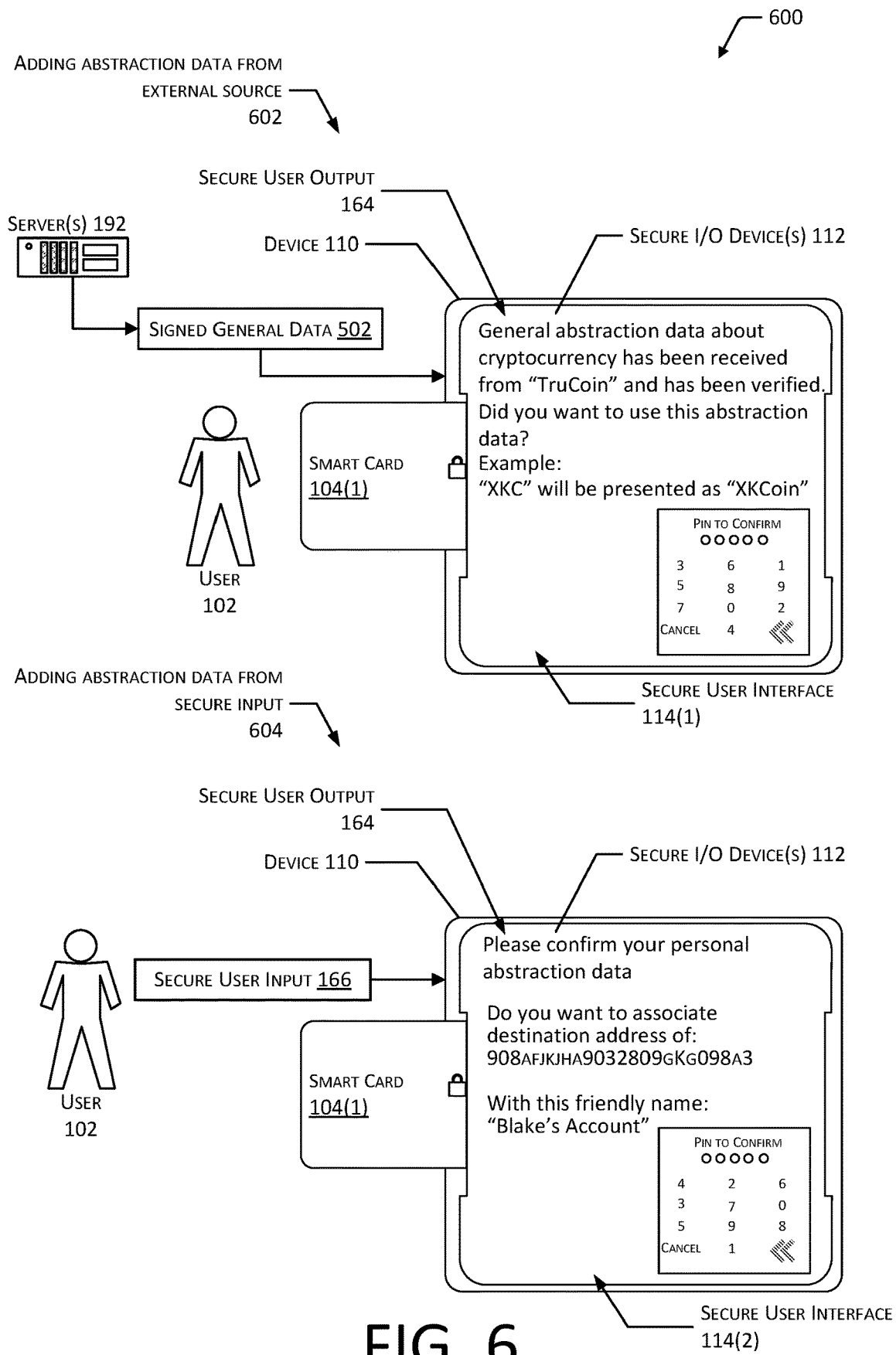
FIG. 6 illustrates adding abstraction data to the system, according to one implementation.

FIG. 6 illustrates at 600 adding abstraction data 154 to the system, according to one implementation. As described above, the abstract module 152 may use abstraction data 154 to process the request data 132 received from the GCE 120 and determine abstracted request data 160. The abstraction data 154 may be received from a source that is external to the SCE 140 as shown at 602, may be determined based on secure input provided within the SCE 140 as shown at 604, or a combination thereof.

At 602, signed general data 502 may be sent from a server to the device 110. The GCE 120 may receive the signed general data 502. The GCE 120 may send the signed general data 502 to the SCE 140. The SCE 140 may attempt to validate the digital signature of the signed general data 502. In this illustration, the digital signature has been deemed to be valid, and the secure I/O device(s) 112 are used to present secure user output 164 in the secure user interface 114(1). As shown, the secure user interface 114(1) presents that the abstraction data has been received, who it is from, presents an example of the abstraction specified, and requests secure user input 166 to confirm that this is to be used by the abstract module 152. If the user 102 indicates acceptance by providing valid secure user input 166, such as by entering a valid passcode 244, the general data 156 included in the signed general data 502 may be stored, and subsequently used by the abstract module 152.

At 604, abstraction data 154 is added to the SCE 140 based at least in part on secure user input 166. In this illustration, the secure user interface 114(2) asks the user if they wish to associate a particular destination address with an arbitrary text string that may be more intelligible to the user 102. If the user 102 indicates acceptance by providing valid secure user input 166, such as by entering a valid passcode 244, the specific data 158 may be stored, and subsequently used by the abstract module 152.

Figure 7:
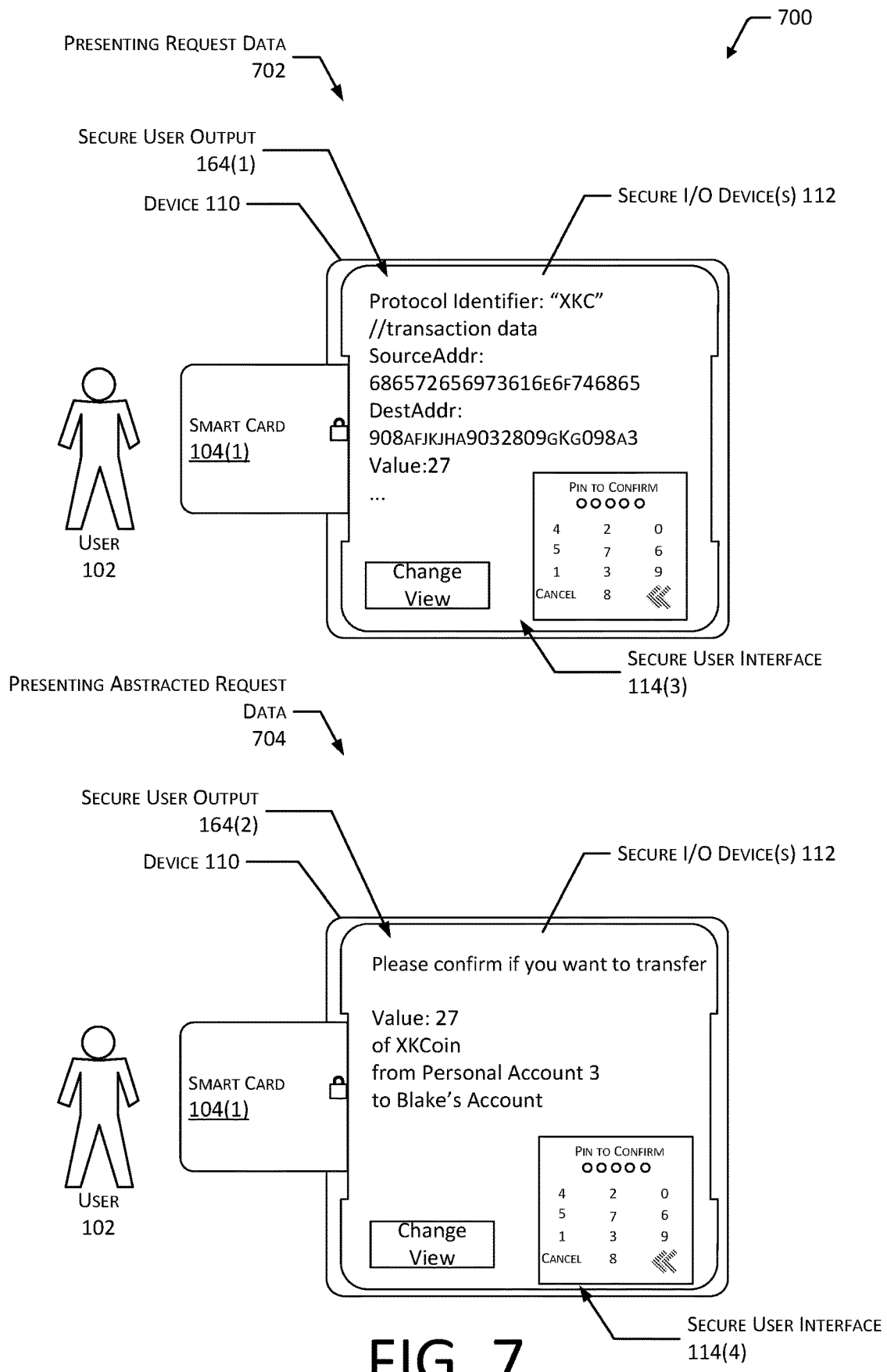
FIG. 7 illustrates presentation of request data and abstracted request data by the secure user interface, according to one implementation.

FIG. 7 at 700 illustrates presentation of request data 132 at 702 and abstracted request data 160 at 704 by the secure user interface 114, according to one implementation. During operation, the user 102 may gain insight as to the transaction that is pending within the SCE 140 by using the secure user interface 114.

At 702, the secure user interface 114(3) presents at least a portion of the request data 132. As described above, the request data 132 may be constructed such that it is intelligible to a user 102. This allows the user 102 to see, in the secure user interface 114, the request data 132 as produced by the request processing module 126. For example, several complex address values are shown. However, some structures of request data 132 may be redundant to some users, less intelligible to some users, and so forth.

At 704, the secure user interface 114(4) presents at least a portion of the abstracted request data 160. This allows the user 102 to see, in the secure user interface 114, the abstracted request data 160 as produced by the abstract module 152. In comparison to the request data 132 shown in the secure user interface 114(3), the transaction has been characterized as a "transfer", addresses have been replaced for presentation with previously specified data, and so forth, improving intelligibility to the user 102. By using the abstract module 152, the abstracted request data 160 may replace, for the purposes of presentation by the secure user interface 114, many lines of the request data 132 with a more intelligible and aggregated representation.

While the user interfaces are depicted in this illustration as visual user interfaces, in other implementations other modalities may be used instead of, or in addition to, visual. For example, information may be presented audibly to the user 102, such as via text-to-speech, audio files, and input may be accepted by a speech-to-text system. In another example, information may be presented to the user via a haptic user interface and input may be accepted by one or more buttons, motion sensors, and so forth. In other examples, the user interface may utilize a human-machine interface that interfaces with at least a portion of the user's 102 anatomy, a virtual reality user interface, and so forth.

Figure 8:
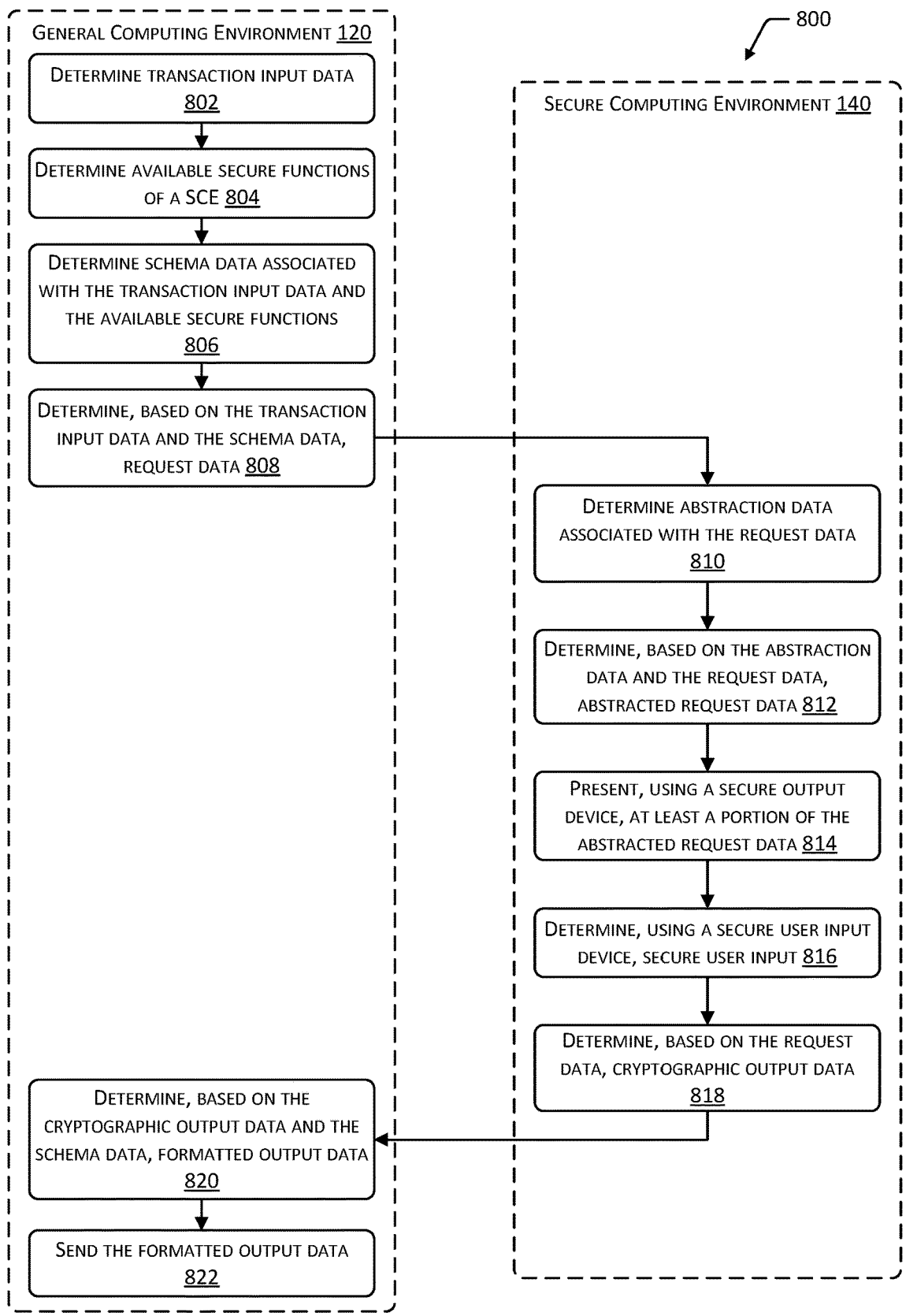
FIG. 8 is a flow diagram of a process for processing transaction input to determine formatted output data, according to one implementation.

FIG. 8 is a flow diagram 800 of a process for processing transaction input to determine formatted output data 182, according to one implementation. The process may be implemented at least in part by the device 110. In this illustration, various operations are described with respect to particular environments. For example, some operations are described with respect to the GCE 120, while others are in the SCE 140. In other implementations, at least some of these operations may be performed in the other environments, or elsewhere. For example, a first device 110(1) may comprise the GCE 120 that uses the network 190 to communicate with a second device 110(2) that comprises the SCE 140. In some implementations, a successful pairing, such as using the pairing module 254 to determine pairing data 268, may be required before the SCE 140 of the second device 110(2) will respond to messages from the GCE 120 of the first device 110(1). In some implementations, one or more operations may be omitted, some operations may be consolidated, and so forth.

At 802 transaction input data 124 is determined within the GCE 120. For example, the user interface module 122 may be used to accept at least a portion of the transaction input data 122 from one or more I/O devices 212, from a paired device that is in communication with the GCE 120, from the network 190, and so forth. The transaction input data 124 may be indicative of a transaction that uses one or more cryptographic functions, cryptographic data such as secrets 242, and so forth.

At 804 the GCE 120 determines the available secure functions 130 of the SCE 140. For example, the GCE 120 may send a request to the SCE 140 for the available secure functions 130(1), a smart card identifier 450 of a currently connected smart card 104, and so forth. Responsive to the request, the SCE 140 may respond with one or more of a version number or other identifier that is indicative of a particular set of available secure functions 130, the smart card identifier 450, a list of available secure functions 130, or other information. For example, the SCE 140 may return a firmware version number that is used by the GCE 120 to retrieve a previously stored list of the available secure functions 130. In some implementations, this operation may be omitted. In the event the request data 132 calls for functionality that the SCE 140 is unable to perform, an error may be returned.

At 806 the schema data 128 associated with the transaction input data 124 is determined by the GCE 120. For example, the request processing module 126 may parse the transaction input data 124 to determine a protocol identifier. Based on the protocol identifier, particular schema information about the associated protocol is retrieved.

At 808, the GCE 120 determines request data 132 based on the transaction input data 124 and the schema data 128. For example, the request processing module 126 may use the schema data 128 associated with the particular protocol identifier to parse the transaction input data 124 and generate the request data 132 based on the transaction input data 124. The GCE 120 may then send the request data 132 to the SCE 140.

In some implementations the available secure functions 130 may be used to determine the request data 132. For example, if the schema data 128 permits alternative cryptographic transformations that may be used, the request processing module 126 may use the alternative supported by the cryptoprocessor 238 in the available smart card 104 to determine the request data 132.

In some implementations, the GCE 120 may use an API to provide the request data 132 to the SCE 140.

At 810 the SCE 140 determines abstraction data 154 that is associated with the request data 132. For example, the abstract module 152 may determine the protocol identifier indicated in the request data 132 and retrieve one or more regexes that are associated with that protocol.

In other implementations, other information may be used to determine the abstraction data 154 associated with the request data 132. For example, the GCE 120 may maintain a copy of the abstraction data 154 to determine one or more retrieval key values or index values associated with the particular portion of the abstraction data 154 that is deemed relevant. These key/index values may be included with request data 132 and then used by the SCE 140 to receive corresponding abstraction data 154. In the event the key/index values are erroneous or have been tampered with, such tampering may be detected by the SCE 140. For example, the abstract module 152 may only permit retrieval of related index values, may only specify a root level index value, and so forth. In the event of an incorrect index value, a failure would result. A failure may result in termination of the current transaction, presentation of an error message, self-destruction, or other actions.

At 812, based on the abstraction data 154 associated with the request data 132 and the request data 132, the SCE 140 determines the abstracted request data 160. For example, the abstract module 152 may use one or more regexes to modify a copy of the request data 132 to determine the abstracted request data 160.

At 814 the SCE 140 uses a secure output device to present secure user output 164 in the secure user interface 114. This secure user output 164 may be at least a portion of one or more of the request data 132, or the abstracted request data 160, and so forth. For example, the secure user interface 114 may be used to present the abstracted request data 160. The presentation of the secure user output 164 mitigates the risk of an unintended signing by providing the user 102 with the opportunity to confirm one or more aspects of the proposed transaction.

At 816 the SCE 140 uses a secure user input device to determine secure user input 166. For example, the secure user input 166 may comprise one or more values associated with the transaction, a passcode 244 or other information to confirm the transaction is to proceed, or other information.

At 818 the SCE 140 determines cryptographic output data 170 based on the request data 132. For example, the request data 132 may include instructions in the instruction data 136 to perform one or more operations on the payload data 134 using the cryptoprocessor 238 to compose the cryptographic output data 170. The cryptographic output data 170 may be sent to the GCE 120.

At 820 the GCE 120 determines, based on the cryptographic output data 170, the formatted output data 182. For example, the output processing module 180 may accept as input the cryptographic output data 170 and use the schema data 128 to generate the formatted output data 182 according to a specified protocol.

At 822 the GCE 120 sends the formatted output data 182. For example, the formatted output data 182 may be sent to a blockchain server 192. The blockchain server 192 may then process the formatted output data 182 and perform one or more transactions associated with the blockchain data 194. In some implementations, the formatted output data 182 may be sent to a device other than that comprising the GCE 120.

In some implementations, one or more operations may be omitted or bypassed. For example, the operations of 810 and 812 may be omitted, and the process may proceed to 814 or 818. In another example, the operations of 810-816 may be omitted and the process may proceed to 818. In still another example, the cryptographic output data 170 may be used without further processing, and operation 820 may be omitted and the cryptographic output data 170 may be sent instead.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, or a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain modules, devices, software programs, processes, or entities, this need not be the case, and a variety of alternative implementations will be understood by those having ordinary skill in the art. For example, the functionality provided by one module may be incorporated into another.

Additionally, those having ordinary skill in the art will readily recognize that the system and techniques described above can be utilized in a variety of devices, environments, and situations.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first device comprising:
a first general computing environment (GCE) comprising:
a first network interface;
a first memory storing first computer-executable instructions; and
a first processor in communication with the first network interface and the first memory, the first processor executing the first computer-executable instructions to:
determine transaction input data indicative of a transaction using one or more cryptographic functions;
determine schema data associated with the transaction input data;
determine, based on the transaction input data and the schema data, request data comprising payload data and instruction data;
send the request data to a first secure computing environment (SCE);
receive, from the first SCE, cryptographic output data;
determine, based on the schema data and the cryptographic output data, formatted output data; and
send, using the first network interface, the formatted output data; and
the first SCE comprising:
a first secure output device;
a first secure input device;
a first secure encrypted memory;
a first cryptoprocessor; and
a second processor in communication with: the first processor, the first secure output device, the first secure input device, the first secure encrypted memory, and the first cryptoprocessor, and the second processor executing second computer-executable instructions to:
receive the request data;
process the payload data, according to the instruction data, using the first cryptoprocessor to determine cryptographic output data; and
send the cryptographic output data to the first GCE.

2. The system of claim 1, wherein the first SCE utilizes one or more static buffers to process the request data.

3. The system of claim 1, the second processor further executing the second computer-executable instructions to:
determine abstraction data associated with the request data;
determine, based on the abstraction data and the request data, abstracted request data;
present, using the first secure output device, at least a portion of the abstracted request data;
determine, using the first secure input device, first secure user input;
determine the first secure user input is valid input; and
wherein the instructions to process the payload data using the first cryptoprocessor are responsive to the valid input.

4. The system of claim 1, wherein the schema data is indicative of one or more of:
grammar associated with a transaction using a first blockchain,
syntax associated with the transaction using the first blockchain,
number base and precision associated with one or more values of the transaction using the first blockchain, or
a message format.

5. The system of claim 1, wherein the request data is formatted as a concise binary object representation (CBOR).

6. The system of claim 1, the second processor further executing the second computer-executable instructions to:
receive signed abstraction data comprising abstraction data, wherein the abstraction data specifies a relationship between first data in the request data and second data;
determine, using the first cryptoprocessor, that the signed abstraction data is validly signed; and
store the abstraction data in the first secure encrypted memory.

7. The system of claim 1, the second processor further executing the second computer-executable instructions to:
determine, using the first secure input device, first secure user input;

determine the first secure user input is valid input;
determine, based at least in part on the valid input, abstraction data, wherein the abstraction data specifies a relationship between first data in the request data and second data; and
store the abstraction data in the first secure encrypted memory.

8. The system of claim 1, the first processor further executing the first computer-executable instructions to:
receive, using the first network interface, the transaction input data from a second device; and
the second processor further executing the second computer-executable instructions to:
determine, using the first secure input device, first secure user input; and
determine, based on the first secure user input, one or more values of the request data.

9. A computer-implemented method comprising:
determining transaction input data, wherein the transaction input data is indicative of a transaction using one or more cryptographic functions;
determining schema data associated with the transaction input data;
determining, based on the transaction input data and the schema data, request data comprising payload data and instruction data;
sending the request data to a secure computing environment (SCE);
receiving, from the SCE, cryptographic output data;
determining, based on the schema data and the cryptographic output data, formatted output data; and
sending the formatted output data.

10. The computer-implemented method of claim 9, further comprising:
processing the request data within the SCE to determine the cryptographic output data, the processing comprising:
determining, based on the payload data, a first input;
accessing secret data stored in secure encrypted memory of the SCE; and
operating at least one processor within the SCE based on an instruction of the instruction data, wherein the instruction is indicative of a cryptographic function, the first input, and the secret data.

11. The computer-implemented method of claim 9, further comprising:
storing abstraction data within the SCE;
determining at least a portion of the abstraction data is associated with the request data;
determining within the SCE, based on the abstraction data and the request data, abstracted request data;
presenting, using a secure output device associated with the SCE, at least a portion of the abstracted request data;
determining, using a secure input device associated with the SCE, secure user input;
determining the secure user input is valid input; and
processing the request data, using the SCE, responsive to the valid input.

12. The computer-implemented method of claim 9, wherein the schema data is indicative of one or more:
grammar associated with a transaction,
syntax associated with the transaction,
number base and precision associated with one or more values of the transaction, or
a message format.

13. The computer-implemented method of claim 9, wherein at least a portion of the request data is formatted as a concise binary object representation (CBOR).

14. The computer-implemented method of claim 9, further comprising:
receiving signed abstraction data comprising abstraction data;
determining, using the SCE, that the signed abstraction data is validly signed; and
storing the abstraction data within the SCE.

15. The computer-implemented method of claim 9, further comprising:
determining, using a secure input device associated with the SCE, secure user input;
determining the secure user input is valid input;
determining, based at least in part on the valid input, abstraction data, wherein the abstraction data specifies a relationship between first data in the request data and second data; and
storing the abstraction data in the SCE.

16. A system comprising:
a first secure computing environment (SCE) comprising:
a communication interface;
a secure output device;
a secure input device;
a secure encrypted memory; and
one or more processors in communication with: the communication interface, the secure output device, the secure input device, and the secure encrypted memory, and the one or more processors executing first computer-executable instructions to:
receive request data comprising payload data and instruction data, wherein the instruction data comprises one or more instructions;
receive, using the communication interface, signed abstraction data;
determine that the signed abstraction data is validly signed;
store at least a portion of the signed abstraction data in the secure encrypted memory;
determine the at least a portion of the signed abstraction data is associated with the request data;
determine, based on the at least a portion of the signed abstraction data and the request data, abstracted request data;
present, using the secure output device, data that is based at least in part on the request data, wherein the abstracted request data is the data that is based at least in part on the request data;
determine, using the secure input device, first secure user input;
based at least in part on the first secure user input, execute the one or more instructions of the instruction data to process the payload data and determine cryptographic output data; and
send, using the communication interface, the cryptographic output data.

17. The system of claim 16, further comprising:
a general computing environment (GCE) comprising:
a second communication interface;
a second memory storing second computer-executable instructions; and
a second processor in communication with the second communication interface and the second memory, the second processor executing the second computer-executable instructions to:

determine transaction input data indicative of a transaction using one or more cryptographic functions;
determine schema data associated with the transaction input data, wherein the schema data is indicative of one or more:
　grammar associated with a transaction,
　syntax associated with the transaction,
　number base and precision associated with one or more values of the transaction, or
　a message format;
determine, based on the transaction input data and the schema data, the request data;
send the request data to the SCE;
receive, from the SCE, the cryptographic output data;
determine, based on the schema data and the cryptographic output data, formatted output data; and
send, using the second communication interface, the formatted output data.

\* \* \* \* \*